(12) United States Patent
Kim et al.

(10) Patent No.: US 11,683,466 B2
(45) Date of Patent: Jun. 20, 2023

(54) APPLICATION PROCESSOR, ELECTRONIC DEVICE INCLUDING THE SAME AND OPERATION METHOD OF THE ELECTRONIC DEVICE

(71) Applicant: Samsung Electronics Co., Ltd., Suwon-si (KR)

(72) Inventors: Daejung Kim, Hwaseong-si (KR); Jongmun Song, Daejeon (KR); Joohyoung Lee, Seoul (KR); Gilseong Heo, Anyang-si (KR); Suyoung Lee, Daejeon (KR); Kilwoo Chung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 51 days.

(21) Appl. No.: 17/352,883

(22) Filed: Jun. 21, 2021

(65) Prior Publication Data
US 2022/0060674 A1     Feb. 24, 2022

(30) Foreign Application Priority Data
Aug. 24, 2020   (KR) ................. 10-2020-0106449

(51) Int. Cl.
| | |
|---|---|
| H04N 13/239 | (2018.01) |
| G06T 3/40 | (2006.01) |
| G06T 5/50 | (2006.01) |
| H04N 23/58 | (2023.01) |
| H04N 23/62 | (2023.01) |
| H04N 23/63 | (2023.01) |

(52) U.S. Cl.
CPC ............ *H04N 13/239* (2018.05); *G06T 3/40* (2013.01); *G06T 5/50* (2013.01); *H04N 23/58* (2023.01); *H04N 23/62* (2023.01); *H04N 23/631* (2023.01); *G06T 2207/20016* (2013.01); *G06T 2207/20221* (2013.01)

(58) Field of Classification Search
None
See application file for complete search history.

(56) References Cited

U.S. PATENT DOCUMENTS

| | | |
|---|---|---|
| 9,906,737 B2 | 2/2018 | Zhang |
| 10,015,407 B2 | 7/2018 | Laroia |
| 10,120,159 B2 | 11/2018 | Laroia |
| 10,154,186 B2 | 12/2018 | Kang et al. |

(Continued)

FOREIGN PATENT DOCUMENTS

| | | |
|---|---|---|
| JP | 2000-115621 A | 4/2000 |
| JP | 3943848 B2 | 7/2007 |

*Primary Examiner* — James M Hannett
(74) *Attorney, Agent, or Firm* — Harness, Dickey & Pierce, P.L.C.

(57) ABSTRACT

An electronic device includes: a display; a first camera module having a first field of view (FoV) and generating first image data; a second camera module having a second FoV that is less than the first FoV and generating second image data; and an application processor configured to obtain zoom information including a zoom ratio and a region of interest (ROI) determined based on a user's input, to generate converted image data by scaling an image area corresponding to the ROI with respect to image data corresponding to the zoom ratio from among the first image data and the second image data, and to control the display to display the converted image data.

17 Claims, 27 Drawing Sheets

(56) References Cited

U.S. PATENT DOCUMENTS

| | | |
|---|---|---|
| 10,412,298 B2 | 9/2019 | Li |
| 10,578,948 B2 * | 3/2020 | Shabtay ........... H04N 5/232933 |
| 2018/0288310 A1 | 10/2018 | Goldenberg |

* cited by examiner

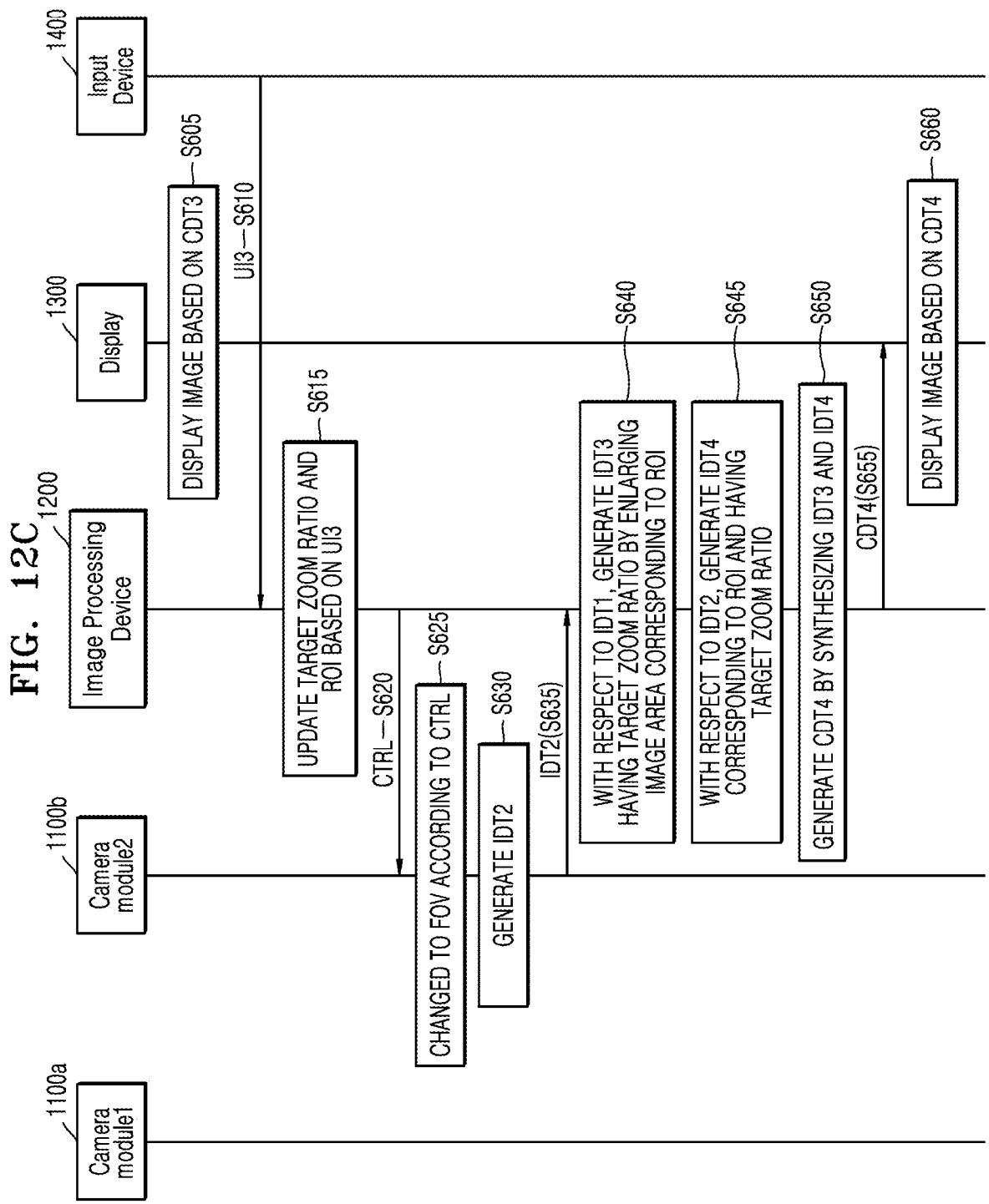

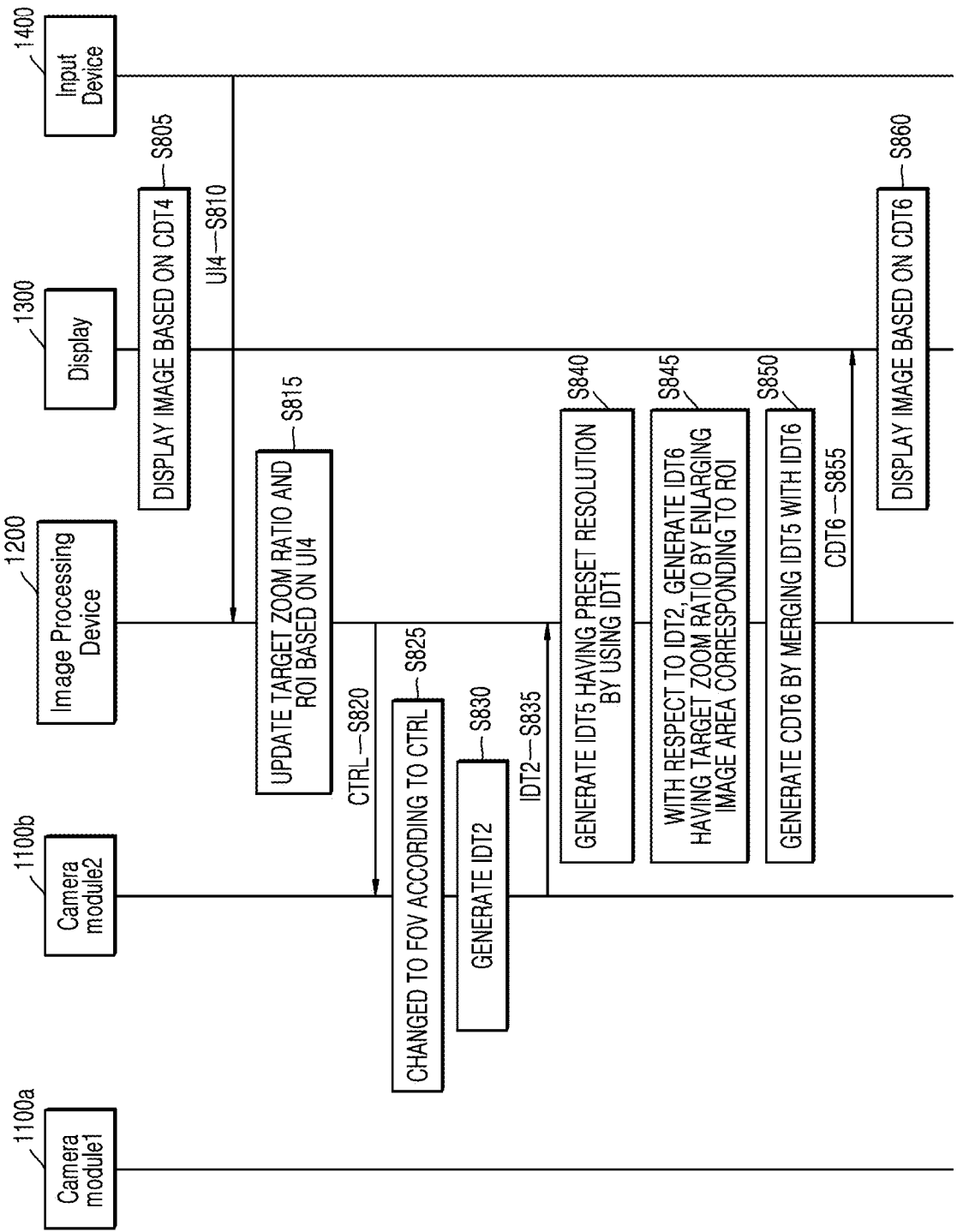

FIG. 13B

| | ZF = 5.0x | ZF > 5.0x |
|---|---|---|
| 1100a<br>Camera Module1 | IDT1(crop & upscaling) | IDT1(downscaling) |
| 1100b<br>Camera Module2 | IDT2(upscaling) | IDT2(crop & upscaling) |
| 1300<br>Display | CDT4 | CDT6 |

APPLICATION PROCESSOR, ELECTRONIC DEVICE INCLUDING THE SAME AND OPERATION METHOD OF THE ELECTRONIC DEVICE

CROSS-REFERENCE TO RELATED APPLICATION

This application is based on and claims priority under 35 U.S.C. § 119 to Korean Patent Application No. 10-2020-0106449, filed on Aug. 24, 2020, in the Korean Intellectual Property Office, the disclosure of which is incorporated by reference herein in its entirety.

BACKGROUND

The present disclosure relates to electronic devices including an application processor, and operation methods of the electronic devices, and more particularly, to application processors performing a zoom function using a plurality of camera modules having different fields of view (FoVs), electronic devices including the application processors, and operation methods of the electronic devices.

In recent years, the demand for a camera module including an image sensor is increasing, and in particular, the demand for a multi-camera system including a plurality of camera modules is continuously increasing. For example, a smart phone equipped with two or more camera modules having different FoVs may display images of various zoom ratios by using the two or more camera modules.

In the case of a conventional multi-camera system, when performing a zoom function on an image, digital zoom is performed based on the center point of a frame. Accordingly, when an object that a user wants to see is not adjacent to the center point of the frame, there is a problem in that the user needs to directly adjust an angle or position of the multi-camera system so that the object to see comes to the center point of the frame. For example, when the multi-camera system performs a high ratio zoom function, an FoV considerably decreases. Accordingly, even if the angle or position of the multi-camera system is slightly moved, the FoV may change rapidly, and it may be difficult for the user to adjust the multi-camera system.

SUMMARY

Provided are application processors that enlarge or reduce image data output by a plurality of camera modules, based on a zoom ratio and a region of interest (ROI) determined based on a user input, electronic devices including the application processors, and operation methods of the electronic devices.

According to an aspect of example embodiments, an electronic device includes: a display; a first camera module having a first field of view (FoV) and configured to generate first image data; a second camera module having a second FoV that is less than the first FoV and configured to generate second image data; and an application processor configured to obtain zoom information including a zoom ratio and an ROI determined based on a user's input, configured to generate converted image data by scaling an image area corresponding to the ROI with respect to image data corresponding to the zoom ratio from among the first image data and the second image data, and configured to control the display to display the converted image data.

According to an aspect of example embodiments, an application processor includes: a first image signal processor configured to receive first image data capturing a first FoV from a first camera module, and configured to generate a first image signal by performing image processing based on the first image data; a second image signal processor configured to receive second image data capturing a second FoV that is less than the first FoV from a second camera module, and configured to generate a second image signal by performing image processing based on the second image data; and a third image signal processor configured to generate converted image data based on at least one of the first image signal and the second image signal, wherein the first image signal processor, the second image signal processor, and the third image signal processor are configured to obtain zoom information including a zoom ratio and an ROI determined based on a user's input. The first image signal processor is configured to generate the first image signal by scaling an image area corresponding to an ROI with respect to the first image data when the zoom ratio is included in a first zoom ratio range, the second image signal processor is configured to generate the second image signal by scaling an image area corresponding to an ROI with respect to the second image data when the zoom ratio is included in a second zoom ratio range, and the third image signal processor is configured to select at least one of the first image signal and the second image signal according to the zoom ratio, and is configured to generate converted image data using the selected image signal.

According to an aspect of example embodiments, an operation method of an electronic device includes: receiving first image data capturing a first FoV from a first camera module; receiving second image data capturing a second FoV from a second camera module; calculating a zoom ratio and an ROI based on a user's touch gesture; scaling an area corresponding to the ROI with respect to the first image data when the zoom ratio is included in a first zoom ratio range; scaling an area corresponding to the ROI with respect to the second image data when the zoom ratio is included in a second zoom ratio range; and generating converted image data based on at least one of the scaled first image data and the scaled second image data.

BRIEF DESCRIPTION OF THE DRAWINGS

Example embodiments of the inventive concepts will be more clearly understood from the following detailed description taken in conjunction with the accompanying drawings in which:

FIGS. 12A to 12E are sequence diagrams illustrating operations between components of an electronic device performing a zoom function;

FIGS. 13A and 13B are views illustrating a result of scaling pieces of image data according to a zoom ratio and an output image of a display;

DETAILED DESCRIPTION OF EXAMPLE EMBODIMENTS

Figure 1:
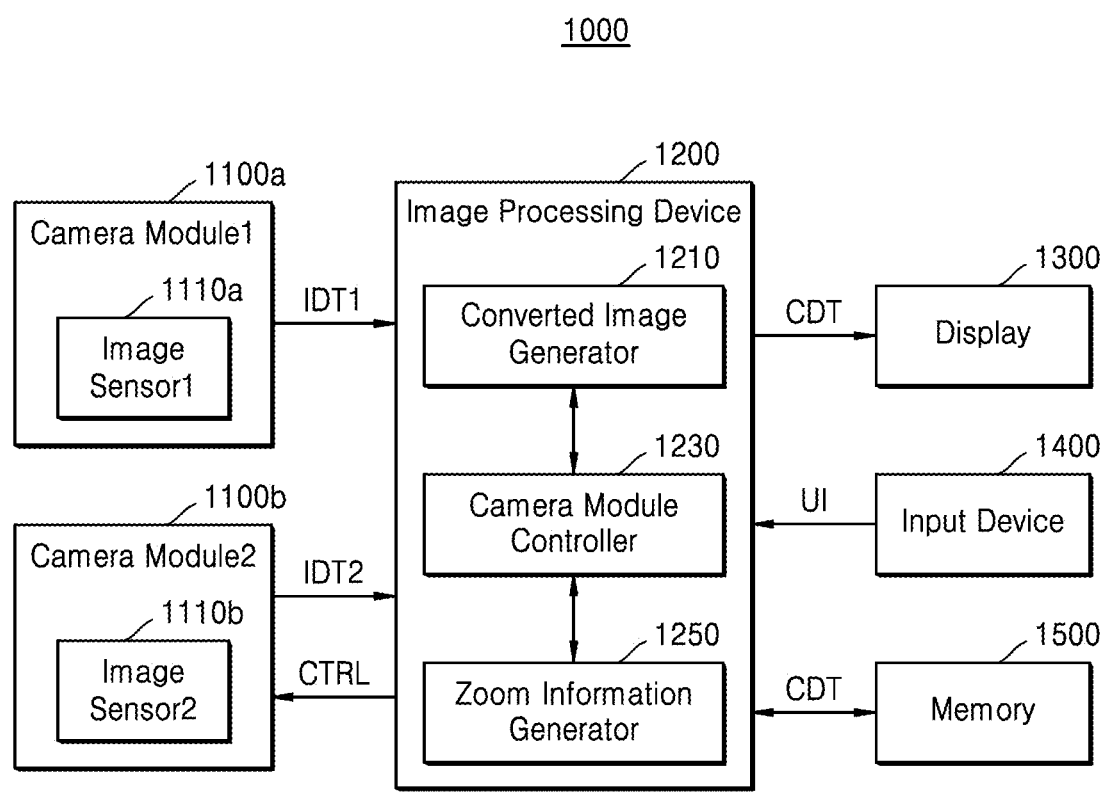
FIG. 1 is a block diagram of an electronic device according to example embodiments.

FIG. 1 is a block diagram of an electronic device 1000 according to example embodiments.

Referring to FIG. 1, the electronic device 1000 may include a first camera module 1100a, a second camera module 1100b, an image processing device 1200, a display 1300, an input device 1400, and/or a memory 1500. For example, the electronic device 1000 may be implemented as a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc.

Each of the first camera module 1100a and the second camera module 1100b may capture a subject (or an object) outside the electronic device 1000 and generate image data. For example, the first camera module 1100a may include a first image sensor 1110a. In addition, the second camera module 1100b may include a second image sensor 1110b. Each of the first image sensor 1110a and the second image sensor 1110b may convert an optical signal of the subject into an electrical signal by an optical lens (not shown). To this end, the first image sensor 1110a and the second image sensor 1110b may include a pixel array in which a plurality of pixels are two-dimensionally arranged. For example, one of a plurality of reference colors may be allocated to each of the plurality of pixels. For example, the plurality of reference colors may include RGB (red, green, and blue) or RGBW (red, green, blue, and white). As a non-limiting example, the first image sensor 1110a and the second image sensor 1110b may be implemented using a charge-coupled device (CCD) or a complementary metal-oxide semiconductor (CMOS), and may be implemented as various types of photoelectric conversion devices.

The first camera module 1100a may generate first image data IDT1 using the first image sensor 1110a, and the second camera module 1100b may generate second image data IDT2 using the second image sensor 1110b. The first image data IDT1 and the second image data IDT2 may be variously referred to as an image frame and frame data. In addition, each of the first camera module 1100a and the second camera module 1100b may transmit the generated first image data IDT1 and second image data IDT2 to the image processing device 1200.

Each of the first camera module 1100a and the second camera module 1100b may generate new first image data IDT1 or second image data IDT2 at preset time intervals, and a frequency corresponding to a period in which new image data is generated may be referred to as a frame rate. That is, the frame rate may represent the number of newly generated image data per unit time.

The first camera module 1100a and the second camera module 1100b may have different fields of view (FoVs). For example, a second field of view (FoV) of the second camera module 1100b may be less than a first FoV of the first camera module 1100a. For example, the first camera module 1100a may be a wide-angle camera, and the second camera module 1100b may be a telephoto camera. Accordingly, for the same subject, the first camera module 1100a may generate wide-angle first image data IDT1, and the second camera module 1100b may generate narrow-angle second image data IDT2.

For example, the second camera module 1100b may be implemented as a folded camera including a prism 1105, as described later below with respect to FIG. 2, and the second FoV of the second camera module 1100b may be changed by adjusting the arrangement of the prism 1105.

The image processing device 1200 may generate converted image data CDT by performing an image processing operation on at least one of the first image data IDT1 and the second image data IDT2 received from the first camera module 1100a and the second camera module 1100b.

The display 1300 may display various content (e.g., text, image, video, icon, or symbol) to a user based on the converted image data CDT received from the image processing device 1200. For example, the display 1300 may include a liquid crystal display (LCD), a light-emitting diode (LED) display, an organic light-emitting diode (OLED) display, a micro electro mechanical system (MEMS) display, or an electronic paper display.

The input device 1400 may transmit instructions or data input from a user or another external device to another component of the electronic device 1000, or may output instructions or data received from another component of the electronic device 1000 to a user or another external device. In an example, the input device 1400 may be implemented as a touch panel and may sense a user's touch input. For example, the input device 1400 that is a touch panel may sense at least one touch input through a user's body part (e.g., finger) or a touch-only input device. In addition, the input device 1400 may convert an analog signal corresponding to a touch input into a digital signal and provide the digital signal to the image processing device 1200 as a user input UI (e.g., coordinate information such as X coordinate and Y coordinate). In an example, when the input device 1400 is a touch panel, the input device 1400 and the display 1300 may be implemented as one device. In some example embodiments, for convenience of description, it is assumed that the input device 1400 is implemented as a touch panel. However, the technical idea of the disclosure is not limited thereto, and it is understood that the input device 1400 may be implemented as various devices such as a keyboard or a mouse.

The memory 1500 is a storage area for storing data, and may store, for example, an operating system (OS), various programs, and a variety of data (e.g., image data). The memory 1500 may be a volatile memory such as dynamic random access memory (DRAM) or static RAM (SRAM), or a nonvolatile memory such as phase change RAM (PRAM), resistive RAM (ReRAM), or a flash memory. In an example, the image processing device 1200 may store the converted image data CDT in the memory 1500. The converted image data CDT stored in the memory 1500 may be used in the image processing device 1200 later or may be stored in a separate storage device.

According to example embodiments, the image processing device 1200 may provide a zoom function to enlarge or reduce an image displayed on the display 1300. In an example, the image processing device 1200 may enlarge or reduce an image according to a digital zoom method or an optical zoom method and display the image on the display 1300. To this end, the image processing device 1200 may include a converted image generator 1210, a camera module controller 1230, and/or a zoom information generator 1250.

The converted image generator 1210 may generate the converted image data CDT based on the first image data IDT1 and the second image data IDT2 respectively received from the first camera module 1100a and the second camera module 1100b. In an example, the converted image generator 1210 may generate the converted image data CDT by cropping and scaling (enlarging or reducing) the first image data IDT1 and/or the second image data IDT2 based on the zoom parameter.

The zoom parameter may include various parameters related to the zoom function. For example, the zoom parameter may include a target zoom ratio a user wants and a region of interest (ROI) that a user wants to zoom in or out. The ROI may be divided into a pixel unit in the image area, or may be divided into a larger area than the pixel unit. For example, the ROI may be divided into a rectangle having a preset aspect ratio, and the preset aspect ratio may correspond to an aspect ratio of the display 1300 (e.g., 16:9 or 2:1). The type of zoom parameter is not limited to the above-described example, and the zoom parameter may include various parameters.

In some example embodiments, the converted image generator 1210 may select image data corresponding to the target zoom ratio from among the first image data IDT1 and the second image data IDT2. The converted image generator 1210 may generate the converted image data CDT by expanding or reducing an image area corresponding to the ROI by the target zoom ratio with respect to the selected image data.

The camera module controller 1230 may control the first camera module 1100a and the second camera module 1100b. In an example, the camera module controller 1230 may generate a control signal CTRL for controlling the second camera module 1100b having a less FoV than the first camera module 1100a based on the zoom parameter. For example, the camera module controller 1230 may generate a control signal CTRL for controlling to change the second FoV of the second camera module 1100b to an FoV corresponding to the ROI included in the zoom parameter. The second camera module 1100b may adjust the arrangement of the prism 1105 to have an FoV corresponding to the ROI according to the received control signal CTRL.

FIG. 1 shows that the camera module controller 1230 transmits the control signal CTRL only to the second camera module 1100b, but the technical idea of the disclosure is not limited thereto. It is understood that the camera module controller 1230 may also transmit the control signal CTRL to the first camera module 1100a.

The zoom information generator 1250 may calculate each of zoom parameters based on a user input, and based on the calculated zoom parameter, may update zoom information including the zoom parameter. In an example, the zoom information generator 1250 may receive the user input UI through the input device 1400, may calculate a target zoom ratio and an ROI based on the received user input UI, and may update existing zoom information.

For example, when the input device 1400 is a touch panel, the user input UI may include a touch gesture. In some example embodiments, the touch gesture may be composed of a single touch input or continuous touch inputs. The touch gesture may include, for example, various gestures such as a touch, a tap, a double tap, a long tap, a drag, drag and drop, a flick, a swipe, a pinch, and the like. The input device 1400 may provide coordinate information of the touch gesture to the zoom information generator 1250. The zoom information generator 1250 may calculate a target zoom ratio a user wants and an ROI that a user wants to zoom in or out based on the coordinate information of the touch gesture.

In addition, the zoom information generator 1250 may provide zoom information to the converted image generator 1210 and the camera module controller 1230. The converted image generator 1210 and the camera module controller 1230 may perform respective functions using a zoom parameter included in the received zoom information.

Each of the camera module controller 1230 and the zoom information generator 1250 may be implemented with software or hardware, or a combination of software and hardware such as firmware. When the zoom information generator 1250 or the camera module controller 1230 is implemented with software, the zoom information generator 1250 or the camera module controller 1230 may be implemented as source code programmed with each of the above functions, and may be loaded into a memory provided in the image processing device 1200 or stored in read-only memory (ROM). In addition, functions of the zoom information generator 1250 or the camera module controller 1230 may be implemented by executing software by a processor (e.g., a microprocessor) included in the image processing device 1200. When the zoom information generator 1250 or the camera module controller 1230 is implemented with hardware, the zoom information generator 1250 or the camera module controller 1230 may include a logic circuit and a register, and may perform respective functions described above based on a register setting.

Figure 2:
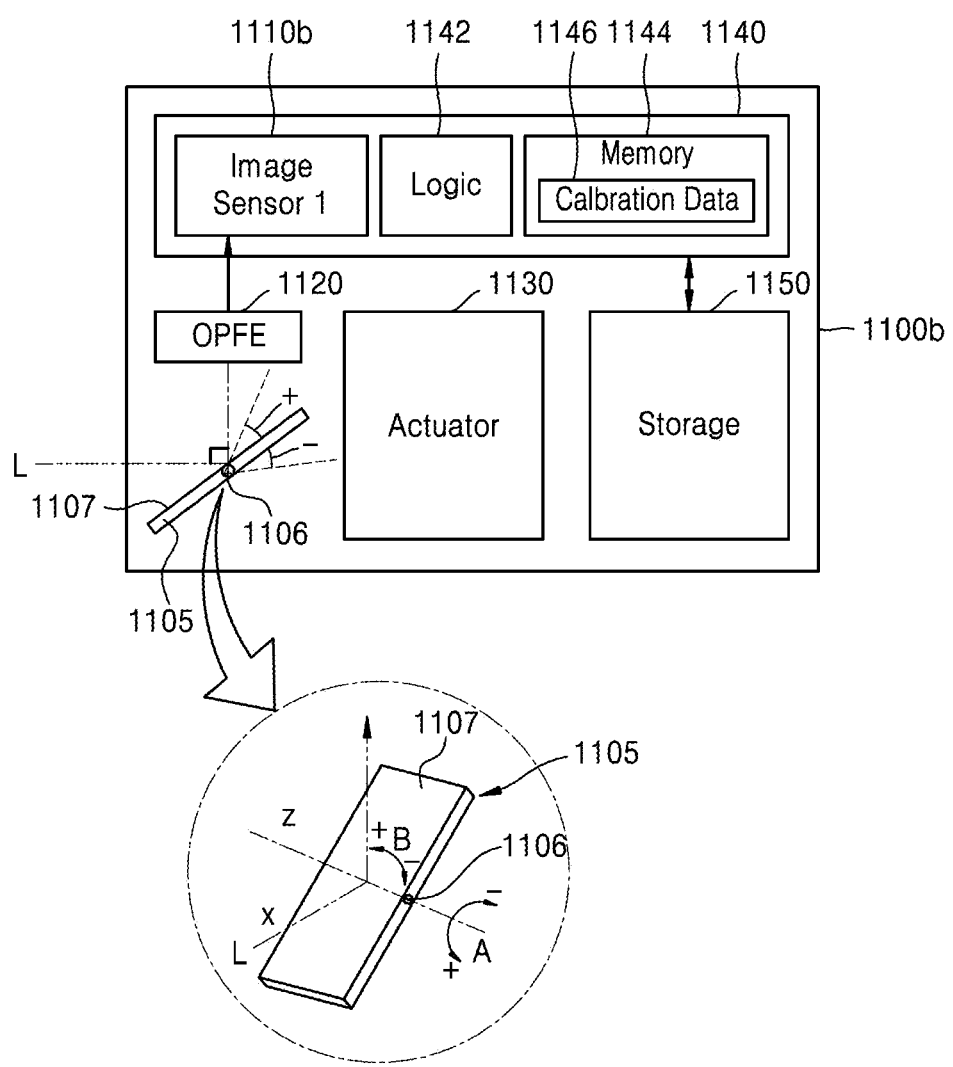
FIG. 2 is a view of a detailed configuration of a camera module according to example embodiments.

FIG. 2 is a view of a detailed configuration of a camera module according to example embodiments. Hereinafter, a detailed configuration of the second camera module 1100b will be described in detail with reference to FIG. 2, but the following description may be equally applied to the first camera module 1100a according to example embodiments.

Referring to FIG. 2, the second camera module 1100b may include the prism 1105, an optical path folding element (hereinafter referred to as OPFE) 1120, an actuator 1130, an image sensing device 1140, and/or a storage 1150.

The prism 1105 may change a path of light L incident from the outside including a reflective surface 1107 of a light reflecting material. In an example, the prism 1105 may change the path of the light L incident in a first direction X to a second direction Y. In some example embodiments, an incident angle of the light L incident from the first direction X to the reflective surface 1107 may be the same as a reflection angle of the light L reflected from the reflective surface 1107 in the second direction Y.

In addition, the prism 1105 may rotate the reflective surface 1107 of the light reflecting material in an A direction around a central axis 1106 or the central axis 1106 itself in a B direction to change the path of the light L incident in the first direction X to the second direction Y. In some example embodiments, the OPFE 1120 may also move in a third direction Z perpendicular to the first direction X and the second direction Y.

In an example, as shown, a maximum rotation angle of the prism 1105 in the A direction is 15 degrees or less in a positive (+) A direction, and may be greater than 15 degrees in a negative (−) A direction. However, example embodiments are not limited thereto. In an example, the prism 1105 may move within 20 degrees in a positive (+) or negative (−) B direction, or between 10 degrees and 20 degrees or between 15 degrees and 20 degrees. In example embodiments, the angle may move at the same angle in the positive (+) or negative (−) B direction, or may move up to a substantially similar angle within a range of about 1 degree. In an example, the prism 1105 may move the reflective surface 1107 of the light reflecting material in the third direction (e.g., the Z direction) parallel to an extending direction of the central axis 1106.

The OPFE 1120 may include, for example, an optical lens including m groups (where m is a positive integer). The m lenses may move in the second direction Y to change an optical zoom ratio of the second camera module 1100b. For example, when Z is a basic optical zoom ratio of the second camera module 1100b, in a case where m optical lenses included in the OPFE 1120 are moved, the optical zoom ratio of the second camera module 1100b may be changed to 3Z, 5Z, or 5Z or more.

The actuator 1130 may move the OPFE 1120 or an optical lens to a specific and/or desired position. For example, the actuator 1130 may adjust the position of the optical lens such that an image sensor 1110b is located at a focal length of the optical lens for accurate sensing. In addition, the actuator 1130 may adjust the arrangement of the prism 1105.

In example embodiments, the actuator 1130 may receive the control signal CTRL for controlling to change an FoV of the second camera module 1100b from the camera module controller 1230 of FIG. 1, and may adjust the arrangement of the prism 1105 according to the received control signal CTRL. For example, the actuator 1130 may rotate the reflective surface 1107 of the prism 1105 in the A direction according to the control signal CTRL, or may move the central axis 1106 of the prism 1105 in the B direction or the reflective surface 1107 of the prism 1105 in the Z direction. Accordingly, the field of view of the second camera module 1100b may be changed in the vertical, left, and right directions.

The image sensing device 1140 may include an image sensor 1110b, a control logic 1142, and/or a memory 1144. The image sensor 1110b may sense an image to be sensed using the light L provided through an optical lens. The control logic 1142 may control all operations of the second camera module 1100b. For example, the control logic 1142 may control the operation of the second camera module 1100b according to the control signal CTRL provided from the camera module controller 1230.

The memory 1144 may store information necessary for the operation of the second camera module 1100b such as calibration data 1146. The calibration data 1146 may include information necessary for the second camera module 1100b to generate the second image data IDT2 using light L provided from the outside. The calibration data 1146 may include, for example, information about a degree of rotation described above, information about a focal length, information about an optical axis, and the like. When the second camera module 1100b is implemented in the form of a multi-state camera in which the focal length is changed according to the position of an optical lens, the calibration data 1146 may include a focal length value for each position (or state) of the optical lens and information related to auto focusing.

The storage 1150 may store the second image data IDT2 sensed through the second image sensor 1110b. The storage 1150 may be arranged outside the image sensing device 1140 and may be implemented in a form stacked with a sensor chip constituting the image sensing device 1140. In some example embodiments, the storage 1150 may be implemented as electrically erasable programmable read-only memory (EEPROM), but example embodiments are not limited thereto.

In an example, the first camera module 1100a of FIG. 1 may include the actuator 1130 like the second camera module 1100b. Accordingly, each of the first camera module 1100a and the second camera module 1100b may include pieces of calibration data 1146 that are the same or different from each other according to the operation of the actuator 1130 included therein.

In an example, the first camera module 1100a may be a camera module in the form of a folded camera including the prism 1105 and the OPFE 1120 described above, like the second camera module 1100b. Alternatively, the first camera module 1100a may be a camera module in the form of a vertical camera that does not include the prism 1105 and the OPFE 1120. Alternatively, the first camera module 1100a may be a depth camera having a vertical camera shape and extracting depth information using infrared ray (IR). In some example embodiments, the image processing device 1200 may generate a 3D depth image by merging image data provided from the depth camera with image data provided from another camera module (e.g., the second camera module 1100b). The shape of the first camera module 1100a is not limited to the above-described example.

Figure 3:
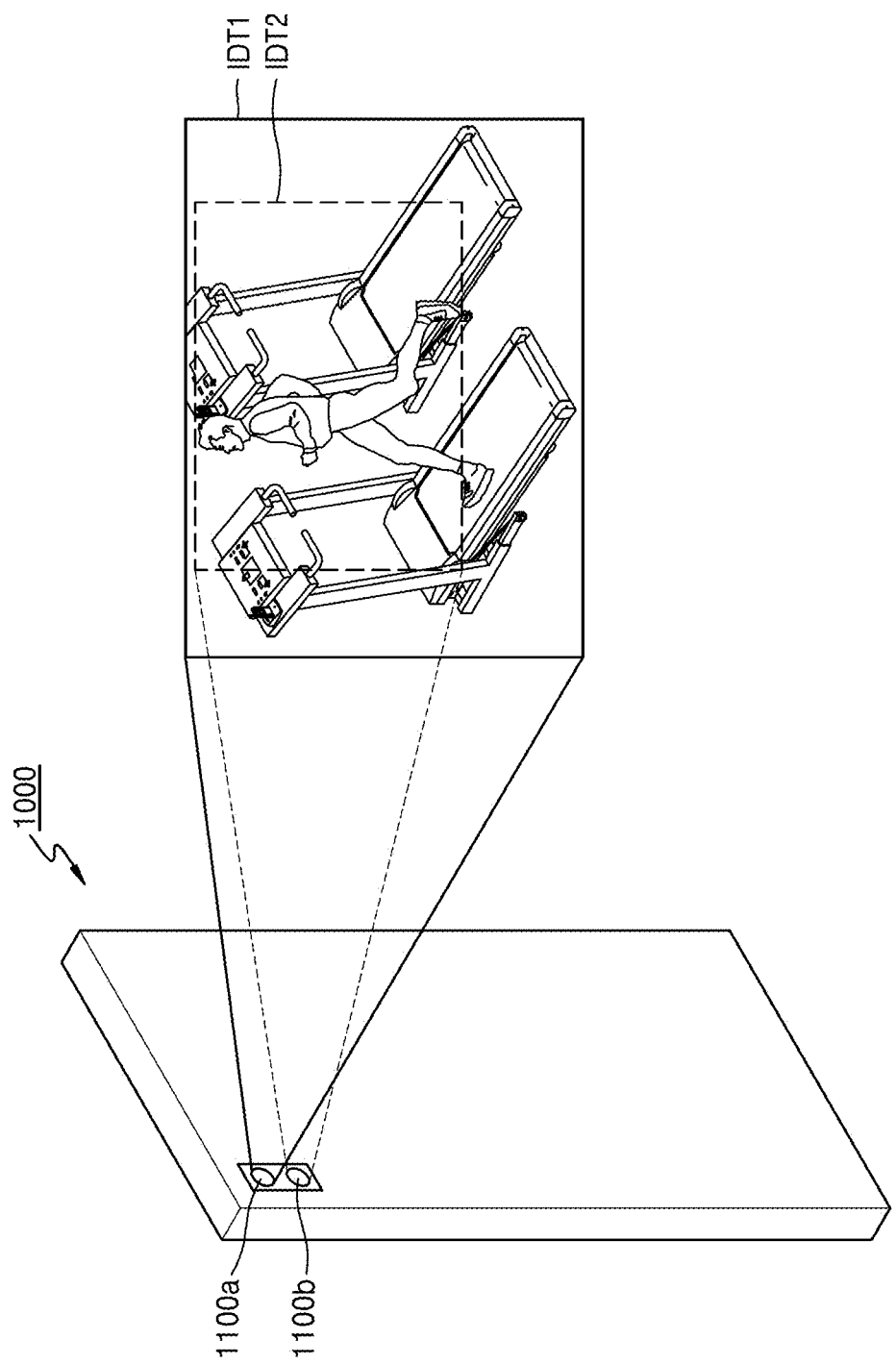
FIG. 3 is a view illustrating an image capturing operation of an electronic device according to example embodiments.

FIG. 3 is a view illustrating an image capturing operation of the electronic device 1000 according to example embodiments.

Referring to FIG. 3, the electronic device 1000 may obtain the first image data IDT1 and the second image data IDT2 by capturing an image of a subject based on the first camera module 1100a and the second camera module 1100b. In an example, the electronic device 1000 may obtain the first image data IDT1 of the subject through the first camera module 1100a having a wide angle, and may obtain the second image data IDT2 of the subject through the second camera module 1100b having a narrow angle. The first image data IDT1 may have a wider image area than that of the second image data IDT2, and the first image data IDT1 and the second image data IDT2 may have areas overlapping each other.

According to example embodiments, the second camera module 1100b may change an FoV by adjusting the arrangement of the prism 1105 according to the control signal CTRL of the camera module controller 1230. When the field of view of the second camera module 1100b is changed, the areas overlapping each other of the first image data IDT1 and the second image data IDT2 may also be changed.

Figure 4:
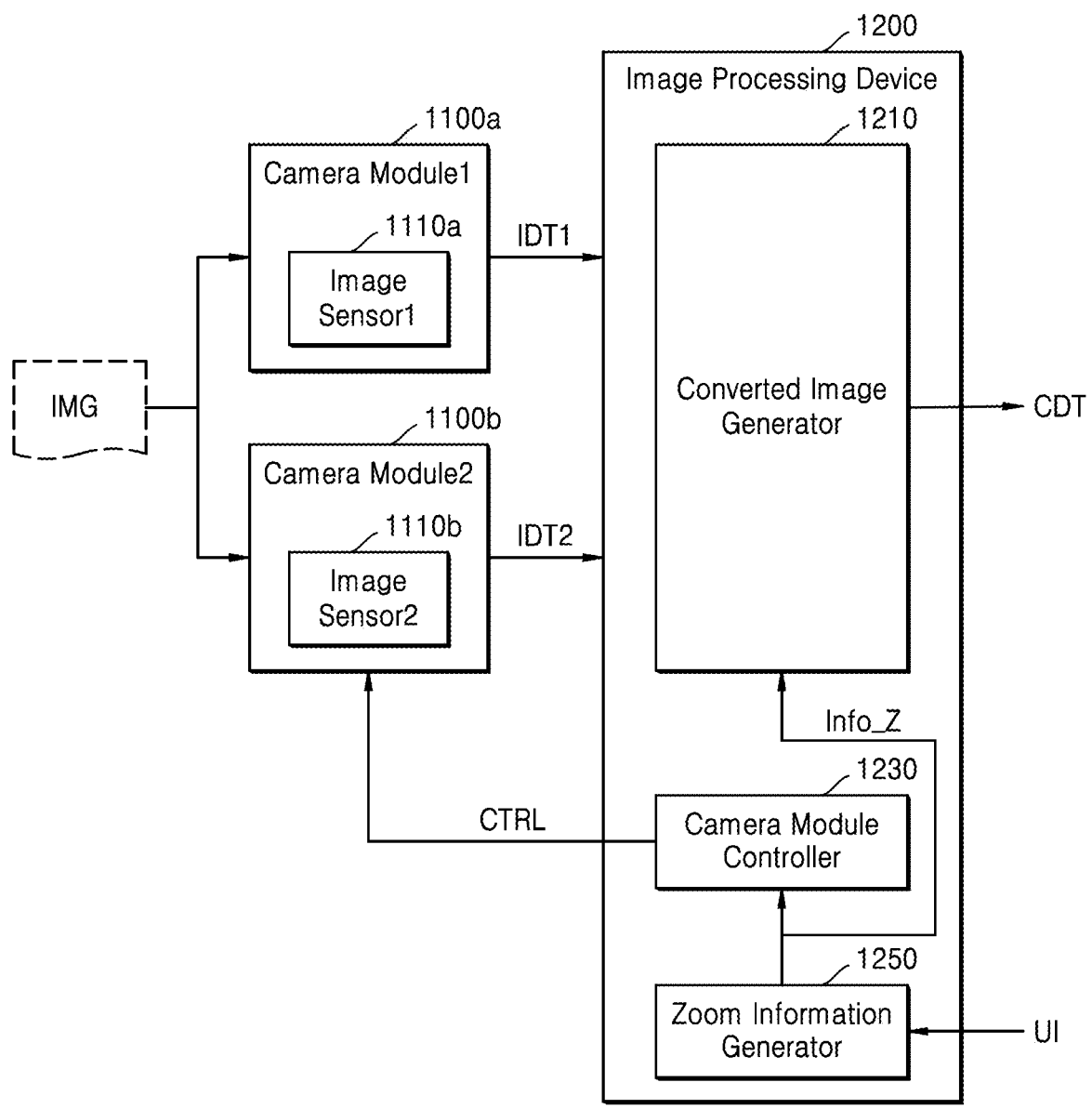
FIG. 4 is a view illustrating an operation of an image processing device according to example embodiments.

FIG. 4 is a view illustrating an operation of the image processing device 1200 according to example embodiments. In example embodiments, FIG. 4 is a view illustrating a zoom function operation of the image processing device 1200 of FIG. 1. Hereinafter, the image processing device 1200 will be described based on a zoom-in operation of enlarging an image among zoom functions, but the following description may be equally applied to a zoom-out operation for reducing an image according to example embodiments.

Referring to FIGS. 1 and 4, by capturing an image IMG of the same subject, the first camera module 1100a may obtain the wide-angle first image data IDT1, and the second camera module 1100b may obtain the narrow angle second image data IDT2. The first camera module 1100a and the second camera module 1100b may output the obtained first image data IDT1 and second image data IDT2 to the converted image generator 1210, respectively.

The converted image generator 1210 may generate converted image data CDT by performing image magnification using a zoom parameter on at least one of the first image data IDT1 and the second image data IDT2. In some example embodiments, the converted image generator 1210 may obtain the zoom parameter by receiving zoom information Info_Z from the zoom information generator 1250.

In an example, the converted image generator 1210 may select image data corresponding to a target zoom ratio from among the first image data IDT1 and the second image data IDT2. In addition, the converted image generator 1210 may generate converted image data CDT having a target zoom ratio by expanding an image area corresponding to an ROI with respect to the selected image data. In an example, the converted image generator 1210 may generate a cropped area by cropping the image area corresponding to the ROI from among the selected image data, and may generate the converted image data CDT having a target zoom ratio by scaling the cropped area.

The correspondence between the target zoom ratio and the image data may be based on a characteristic (e.g., an FoV) of a camera module that generated the image data. For example, a first zoom ratio range including relatively small target zoom ratios may be set to correspond to the first image data IDT1 generated by the first camera module 1100a having a wide angle (e.g., 1.0× or more and less than 5.0×). In addition, a second zoom ratio range including relatively large target zoom ratios may be set to correspond to the second image data IDT2 generated by the second camera module 1100b having a narrow angle (e.g., 5.0× or more). However, the disclosure is not limited to the above-described example, and the first zoom ratio range and the second zoom ratio range may be implemented to have zoom ratio ranges overlapping each other.

Accordingly, the converted image generator 1210 may generate converted image data CDT in which an ROI is enlarged based on the first image data IDT1 generated by the first camera module 1100a in the first zoom ratio range, and may generate converted image data CDT in which an ROI is enlarged based on the second image data IDT2 generated by the second camera module 1100b in the second zoom ratio range. That is, the camera module may be converted at a boundary between the first zoom ratio range and the second zoom ratio range.

In an example, the first camera module 1100a and the second camera module 1100b may obtain new first image data IDT1 and new second image data IDT2 according to a preset frame rate, and may output them to the converted image generator 1210. Accordingly, the converted image generator 1210 may periodically receive new first image data IDT1 and new second image data IDT2, and may repeat the above-described operations by using the received new first image data IDT1 and new second image data IDT2.

The zoom information generator 1250 may generate the zoom information Info_Z including zoom parameters such as a target zoom ratio and an ROI, and may provide the generated zoom information Info_Z to the converted image generator 1210 and the camera module controller 1230. Each of the converted image generator 1210 and the camera module controller 1230 may internally provide a buffer (not shown) for storing the zoom information Info_Z.

In an example, the zoom information generator 1250 may first generate the zoom information Info_Z including a target zoom ratio with a value of a default zoom ratio and an ROI with a value of a default area. In a non-limiting example, the default zoom ratio may be set to the same value as that of a default optical zoom ratio (e.g., 1.0×) of the first camera module 1100a. In addition, the default area may be set as a rectangular area including the center point of an image area and having an aspect ratio of the display 1300. For example, the default area may be set to the same value as that of the entire image area of the first image data IDT1.

Accordingly, when a zoom function starts, the converted image generator 1210 may receive the zoom information Info_Z having default values, and may generate the converted image data CDT based on zoom parameters having default values included in the received zoom information Info_Z. In example embodiments, the converted image generator 1210 may select the first image data IDT1 as image data corresponding to the default zoom ratio. In addition, the converted image generator 1210 may generate a cropped area by cropping an image area corresponding to a default area with respect to the first image data IDT1, and may generate converted image data CDT having a default zoom ratio by scaling the cropped area. In addition, the generated converted image data CDT may be displayed on the display 1300. On the other hand, as in the above-described example, when the default area is described with the same value as that of the entire image area of the first image data IDT1, the converted image generator 1210 may generate the converted image data CDT with the first image data IDT1 without performing cropping and scaling.

On the other hand, unlike the above-described example, the converted image generator 1210 may be implemented to pre-store a zoom parameter having default values in the internally provided buffer (not shown). In some example embodiments, the converted image generator 1210 may generate the converted image data CDT using the pre-stored zoom parameter even if the zoom information Info_Z has not yet been received from the zoom information generator 1250.

In an example, the zoom information generator 1250 may update a zoom parameter based on the user input UI received from the input device 1400. Further, the zoom information generator 1250 may generate new zoom information Info_Z based on the updated zoom parameter, and may provide the new zoom information Info_Z to the converted image generator 1210 and the camera module controller 1230.

In example embodiments, the zoom information generator 1250 may receive the user input UI including coordinate information of a touch gesture from the input device 1400 while, for example, the converted image data CDT generated based on the zoom parameter having the default values is displayed. Further, the zoom information generator 1250 may determine whether the touch gesture is related to a zoom function based on the coordinate information. When the touch gesture is related to a zoom function, the zoom information generator 1250 may update the zoom parameter based on the user input UI.

The touch gesture related to a zoom function may include at least one of a touch gesture corresponding to zoom-in, a touch gesture corresponding to zoom-out, and a touch gesture for selecting an ROI. In a non-limiting example, the touch gesture corresponding to zoom-in may be set as pinch-out to enlarge a distance between fingers while touching with two fingers (or a touch-only input device), and the touch gesture corresponding to zoom-out may be set as pinch-in to reduce a distance between fingers. In addition, the touch gesture for selecting an ROI may be set as a touch, a tap, a double tap, a long tap, drag and drop, and a pinch drag, as well as the pinch-out and pinch-in described above.

When checking the touch gesture related to a zoom function, the zoom information generator 1250 may calculate a target zoom ratio and/or an ROI based on the coordinate information. For example, when the touch gesture is pinch-out, the zoom information generator 1250 may calculate a target zoom ratio and an ROI based on the coordinate information. As another example, when the touch gesture is a tap, the zoom information generator 1250 may calculate an ROI based on the coordinate information. A detailed operation of the zoom information generator 1250 calculating a zoom ratio and an ROI will be described later with reference to FIGS. 5 to 8.

The converted image generator 1210, when receiving new zoom information Info_Z from the zoom information generator 1250, may generate new converted image data CDT by using a target zoom ratio and an ROI included in the new zoom information Info_Z. In example embodiments, because the first camera module 1100a and the second camera module 1100b output the new first image data IDT1 and the new second image data IDT2 at a preset period, the converted image generator 1210 may generate new converted image data CDT by using the new zoom information Info_Z for at least one of the new first image data IDT1 and the new second image data IDT2.

For example, the new zoom information Info_Z may include a target zoom ratio indicating a zoom ratio of 1.5× and an ROI indicating an upper right area of an image area. In some example embodiments, the converted image generator 1210, for the second image data IDT2 corresponding to a zoom ratio of 1.5×, may generate a cropped area by cropping the upper right area, and may generate converted image data CDT having a zoom ratio of 1.5× by scaling the generated cropped area. As another example, the received zoom information Info_Z may include a target zoom ratio indicating a zoom ratio of 5.5× and an ROI indicating a lower right area of an image area. In some example embodiments, the converted image generator 1210, for the second image data IDT2 corresponding to a zoom ratio of 5.5×, may generate a cropped area by cropping the lower right area, and may generate converted image data CDT having a zoom ratio of 5.5× by scaling the generated cropped area.

The camera module controller 1230 may receive the zoom information Info_Z from the zoom information generator 1250, and may generate the control signal CTRL for controlling the second camera module 1100b based on a zoom parameter included in the received zoom information Info_Z. For example, the camera module controller 1230 may generate the control signal CTRL for controlling an FoV of the second camera module 1100b to be changed to an FoV corresponding to an ROI, and may provide the generated control signal CTRL to the second camera module 1100b through an inter integrated circuit (I2C) bus. A detailed operation of the camera module controller 1230 generating the control signal CTRL will be described later with respect to FIG. 9.

In summary, the image processing device 1200 may first display a first image captured by the first camera module 1100a, which is a wide-angle camera, to a user, and may use the first image until the first image reaches a certain zoom ratio to display a first image in which an ROI is enlarged. At the same time, the image processing device 1200 may pre-adjust an FoV of the second camera module 1100b, which is a telephoto camera, to correspond to the ROI. In addition, when the image processing device 1200 reaches a certain zoom ratio (e.g., when camera module conversion is performed), the image processing device 1200 may display a second image in which the ROI is enlarged by using a second image captured by the second camera module 1100b.

Figure 7:
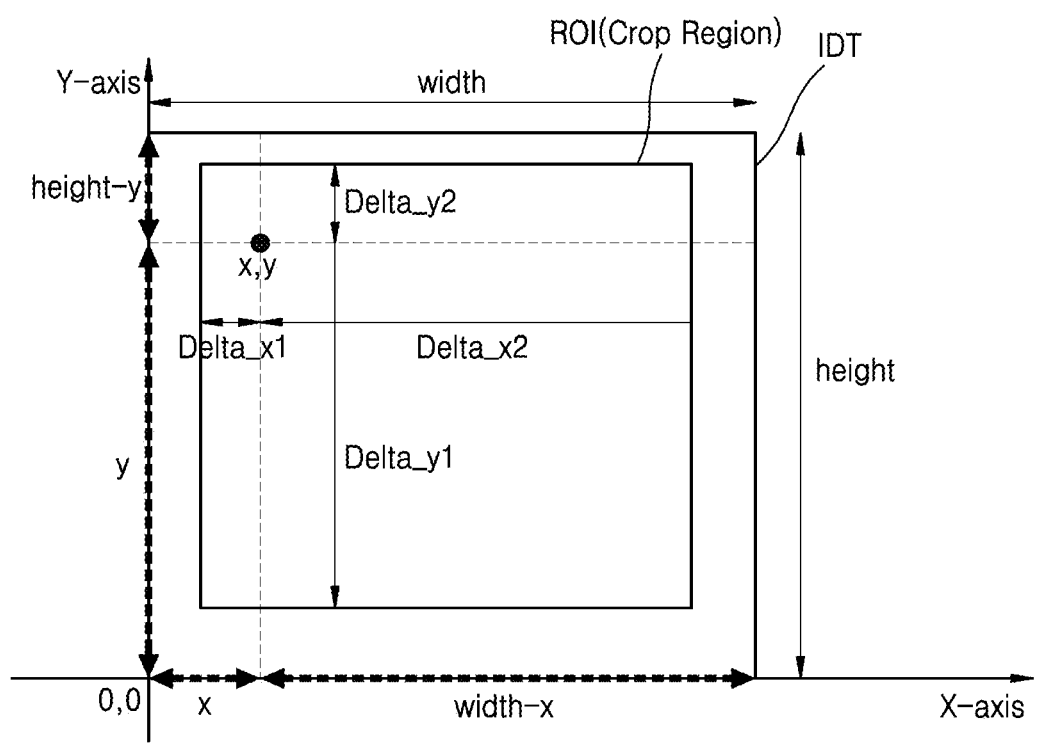
FIG. 7 is a view illustrating a method of calculating a region of interest (ROI) according to example embodiments.
Figure 8:
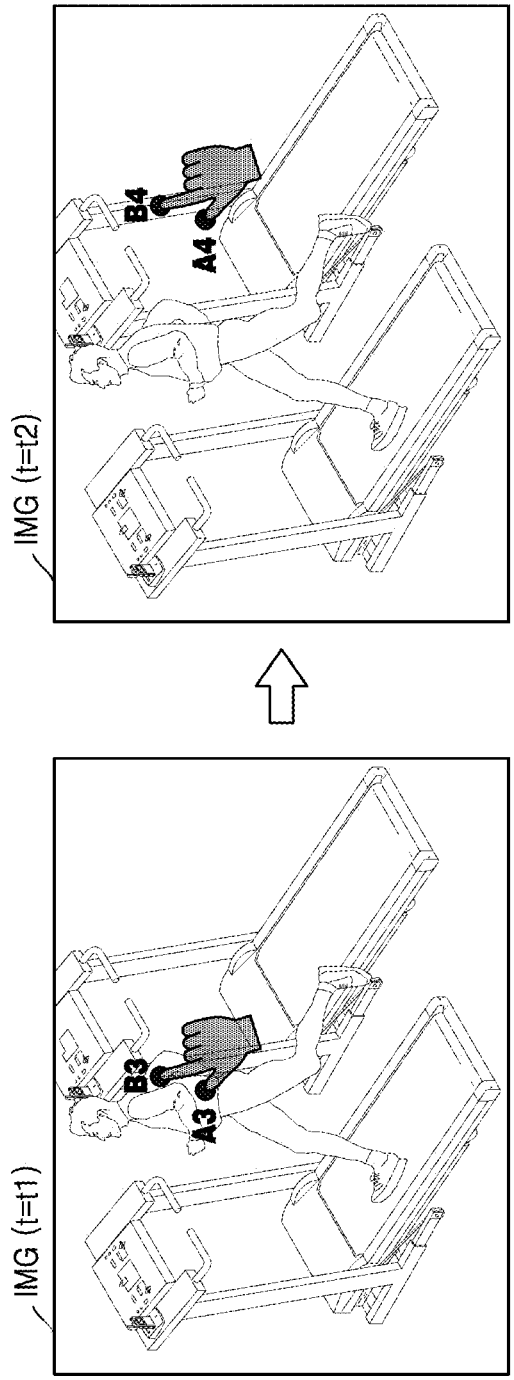
FIG. 8 is a view of a touch gesture related to a zoom function according to example embodiments.

As such, the image processing device 1200 according to the disclosure may reduce a delay required to display an image corresponding to an ROI when a camera module is converted according to an increase in a zoom ratio by pre-adjusting an FoV of a camera module (e.g., the second camera module 1100b) corresponding to a high zoom ratio to correspond to the ROI. In addition, the image processing device 1200 according to the disclosure may reduce or prevent inconvenience in which a user needs to directly adjust an angle of a camera module in order to ensure that an ROI is included in an FoV of the camera module corresponding to a high zoom ratio, FIG. 5 is a flowchart illustrating an update operation of a zoom parameter of the zoom information generator 1250 according to example embodiments, FIG. 6 is a view of a touch gesture related to a zoom function according to example embodiments, FIG. 7 is a view illustrating a method of calculating an ROI according to example embodiments, and FIG. 8 is a view of a touch gesture related to a zoom function according to example embodiments.

Figure 5:
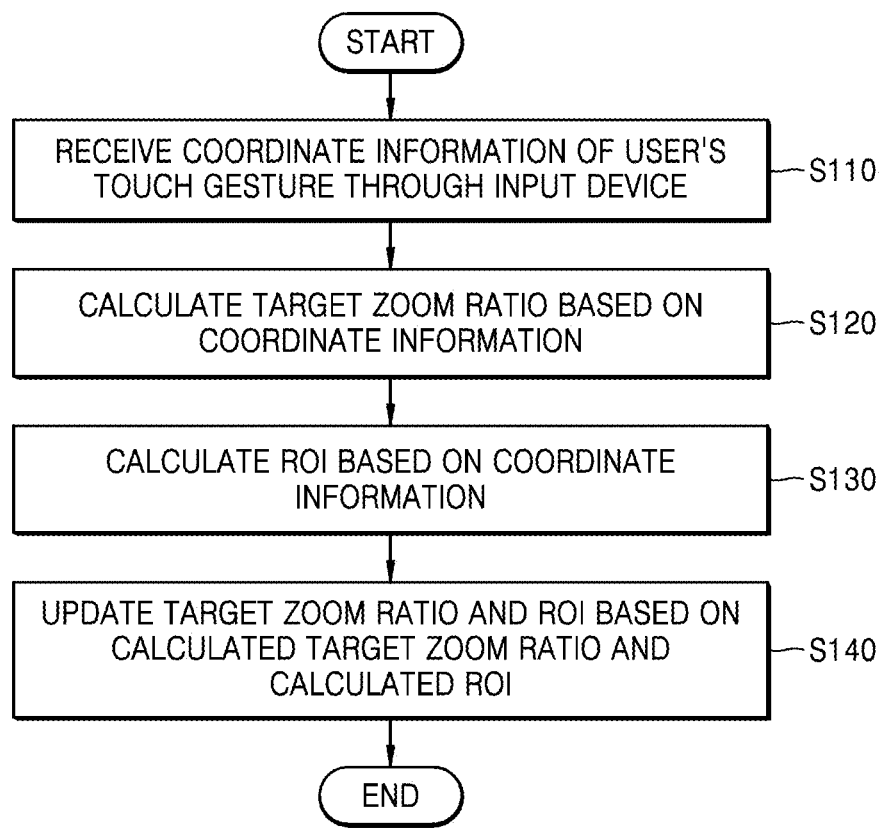
FIG. 5 is a flowchart illustrating an update operation of a zoom parameter of a zoom information generator according to example embodiments.

Referring to FIG. 5, in operation S110, the zoom information generator 1250 may receive coordinate information of a user's touch gesture through the input device 1400. In an example, the zoom information generator 1250 may receive coordinate information of a touch gesture. Further, the zoom information generator 1250 may determine whether the user's touch gesture is related to a zoom function based on the coordinate information.

In addition, in operation S120, the zoom information generator 1250 may calculate a target zoom ratio based on the coordinate information. In an example, when the user's touch gesture is a touch gesture corresponding to zoom-in or zoom-out (e.g., pinch-out, pinch-in), the zoom information generator 1250 may calculate a target zoom ratio based on coordinate information.

Figure 6:
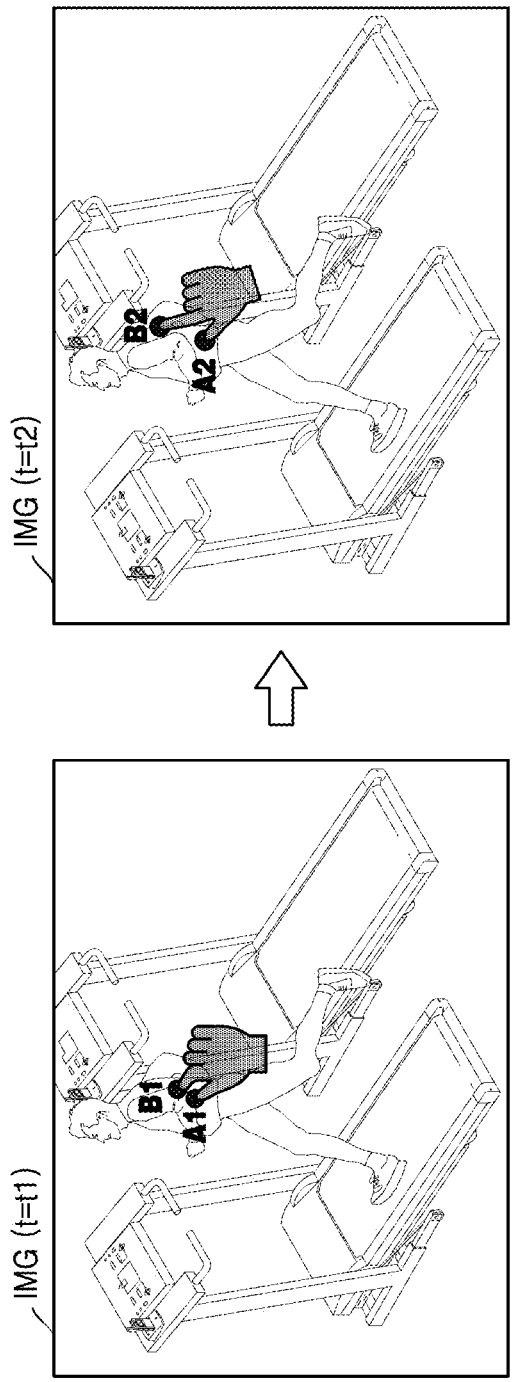
FIG. 6 is a view of a touch gesture related to a zoom function according to example embodiments.

In some example embodiments, referring to FIG. 6, a user may perform pinch-out corresponding to zoom-in on the image IMG displayed on the display 1300. In addition, the zoom information generator 1250 may receive coordinate information of a pinch-out gesture. In an example, the zoom information generator 1250 may obtain coordinate information (X coordinate and Y coordinate) of consecutive touch inputs constituting a pinch-out gesture from the input device 1400 that outputs coordinates of a touch input at a preset period. For example, the zoom information generator 1250 may obtain coordinate information of first touch inputs A1 and B1 and second touch inputs A2 and B2 constituting a pinch-out gesture. The first touch inputs A1 and B1 are touch inputs at a first time t1, and the second touch inputs A2 and B2 are touch inputs at a second time t2 after the first time t1. A difference between the first time t1 and the second time t2 may correspond to a preset period of the input device 1400.

Further, the zoom information generator 1250 may calculate a first distance between the first touch inputs A1 and B1 and may calculate a second distance between the second touch inputs A2 and B2. In addition, the zoom information generator 1250 may calculate a target zoom ratio based on a difference between the first distance and the second distance. The degree of magnification desired by a user, which means the difference between the first distance and the second distance, may vary according to a zoom ratio (e.g., a previous zoom ratio) of an image displayed on the display 1300. Accordingly, the zoom information generator 1250 may calculate a target zoom ratio by using a function using the difference between the first distance and the second distance and the previous zoom ratio as variables. However, a method of calculating a target zoom ratio by the zoom information generator 1250 using coordinate information is not limited to the above-described example, and the target zoom ratio may be calculated by various methods.

Further, in operation S130, the zoom information generator 1250 may calculate an ROI based on the coordinate information. In an example, when a user's touch gesture is for selecting an ROI (e.g., pinch-out, pinch-in, a touch, a tap, a double tap, a long tap, drag and drop, a pinch drag, etc.), the zoom information generator 1250 may calculate the ROI based on coordinate information.

In some example embodiments, referring again to FIG. 6, the zoom information generator 1250 may calculate a center point by using the coordinate information of the first touch inputs A1 and B1 or the coordinate information of the second touch inputs A2 and B2. For example, the zoom information generator 1250 may obtain coordinates of the center point by calculating an average value of the X coordinate and an average value of the Y coordinate of the first touch inputs A1 and B1.

A touch gesture may be input from a user while an image displayed on the display 1300 is already enlarged or reduced. In some example embodiments, when the obtained coordinates of the center point are used as they are, an image area other than the image area actually desired by a user may be enlarged or reduced. Accordingly, the zoom information generator 1250 may correct the obtained coordinates of the center point by using information related to an image currently displayed on the display 1300, for example, information such as a previous target zoom ratio or a previous ROI.

In an example, the zoom information generator 1250 may check coordinates corresponding to the coordinates of the center point on the entire image area of the first image data IDT1 or the second image data IDT2 based on a previous target zoom ratio and a previous ROI, and may correct the coordinates of the center point with the checked coordinates. For example, the zoom information generator 1250 may check coordinates corresponding to the coordinates of the center point on the entire image area of the first image data IDT1 when a previously calculated target zoom ratio is within the first zoom ratio range (e.g., 1.0× or more and less than 5.0×), and may check coordinates corresponding to the coordinates of the center point on the entire image area of the second image data IDT2 when a target zoom ratio is within the second zoom ratio range (e.g., 5.0× or more).

Further, the zoom information generator 1250 may calculate an ROI based on the corrected coordinates of the center point and the target zoom ratio. Referring to FIG. 7, the zoom information generator 1250 may calculate an ROI from the resolution of image data IDT (e.g., the first image data IDT1 or the second image data IDT2). In some example embodiments, the resolution of the image data IDT used to calculate the ROI is the resolution of image data IDT corresponding to a target zoom ratio from among the first image data IDT1 and the second image data IDT2. In a non-limiting example, the zoom information generator 1250 may use the first image data IDT1 when the target zoom ratio is within a first zoom ratio range (e.g., 1.0× or more and less than 5.0×), or may use the second image data IDT2 when the target zoom ratio is within a second zoom ratio range (e.g. 5.0× or more).

In addition, the zoom information generator 1250 may calculate Delta_x1, Delta_x2, Delta_y1, and Delta_y2 according to the following equation by using coordinates of a center point.

$$\text{Delta\_}x1 = K \times \frac{\text{Width}}{\text{Zoom Ratio}} \times \frac{x}{\text{Width}} = \frac{Kx}{\text{Zoom Ratio}}$$

$$\text{Delta\_}x2 = K \times \frac{\text{Width}}{\text{Zoom Ratio}} \times \frac{\text{Width}-x}{\text{Width}} = \frac{K(\text{Width}-x)}{\text{Zoom Ratio}}$$

$$\text{Delta\_}y1 = K \times \frac{\text{Height}}{\text{Zoom Ratio}} \times \frac{y}{\text{Height}} = \frac{Ky}{\text{Zoom Ratio}}$$

$$\text{Delta\_}x2 = K \times \frac{\text{Height}}{\text{Zoom Ratio}} \times \frac{\text{Height}-y}{\text{Height}} = \frac{K(\text{Height}-x)}{\text{Zoom Ratio}}$$

Where Width and Height are width and height of the resolution of the image data IDT, Zoom Ratio is a target zoom level, x and y are x and y coordinates of a corrected center point, and K is a constant corresponding to the image data IDT. The zoom information generator 1250 may use K corresponding to the first image data IDT1 or K corresponding to the second image data IDT2 according to a calculated target zoom ratio. For example, the zoom information generator 1250 may use K corresponding to the first image data IDT1 when the target zoom ratio is within the first zoom ratio range (e.g., 1.0× or more and less than 5.0×), or may use K corresponding to the second image data IDT2 when the target zoom ratio is within the second zoom ratio range (e.g. 5.0× or more).

The zoom information generator 1250 may use the calculated Delta_x1, Delta_x2, Delta_y1, and Delta_y2 to calculate coordinates of four surfaces (left, right, top, and bottom) constituting a cropped area to be cropped from the image data IDT according to the following equation.

Left=$x$−Delta_$x$1

Right=$x$+Delta_$x$2

Top=$y$+Delta_$y$2

Bottom=$y$−Delta_$y$1

Where x and y are x and y coordinates of the center point, Left and Right are coordinates on an X axis, and Top and Bottom are coordinates on a Y axis.

In an example, the ROI may be expressed by coordinates of four surfaces constituting the area, or may be expressed by coordinates of four vertices constituting the area. Accordingly, the zoom information generator 1250 may determine the calculated coordinates of the four surfaces (left, right, top, and bottom) as the ROI, or may calculate the ROI by calculating four vertices based on the calculated coordinates of the four surfaces (left, right, top, and bottom).

In the above-described example, it has been described that the zoom information generator 1250 calculates the ROI using the image data IDT corresponding to a target zoom ratio, but the technical idea of the disclosure is not limited thereto. For example, the zoom information generator 1250 may calculate an ROI of each of the first image data IDT1 and the second image data IDT2 by using the coordinates of the center point. In addition, a method of calculating the ROI and the type of data representing the ROI are not limited to the above-described examples, and various calculation methods and various types of data may be applied.

In addition, in operation S140, the zoom information generator 1250 may update the target zoom ratio and the ROI based on the calculated target zoom ratio and the calculated ROI. In an example, the zoom information generator 1250 may update the target zoom ratio and the ROI using the calculated target zoom ratio and the calculated ROI, and may generate the zoom information Info_Z based on the updated target zoom ratio and the updated ROI.

On the other hand, it is assumed that the user's touch gesture is pinch-out in showing and describing FIGS. 5 to 7. However, it is understood that the technical idea of the disclosure may be applied to other touch gestures corresponding to the zoom function. For example, among touch gestures, a tap may correspond to selection of an ROI. When a tap is input, the zoom information generator 1250 may determine coordinates of one touch input constituting the tap as the center point in the above-described example, and may calculate an ROI according to the above-described methods.

As another example, referring to FIG. 8, among touch gestures, a pinch drag may also correspond to the selection of an ROI. The zoom information generator 1250 may obtain coordinate information of consecutive touch inputs constituting the pinch drag. For example, the zoom information generator 1250 may obtain coordinate information of the first touch inputs A1 and B1 and the second touch inputs A2 and B2. In addition, the zoom information generator 1250 may calculate a center point by using the coordinate information of the first touch inputs A1 and B1 or the coordinate information of the second touch inputs A2 and B2. In addition, the zoom information generator 1250 may calculate an ROI according to the above-described methods.

Figure 9:
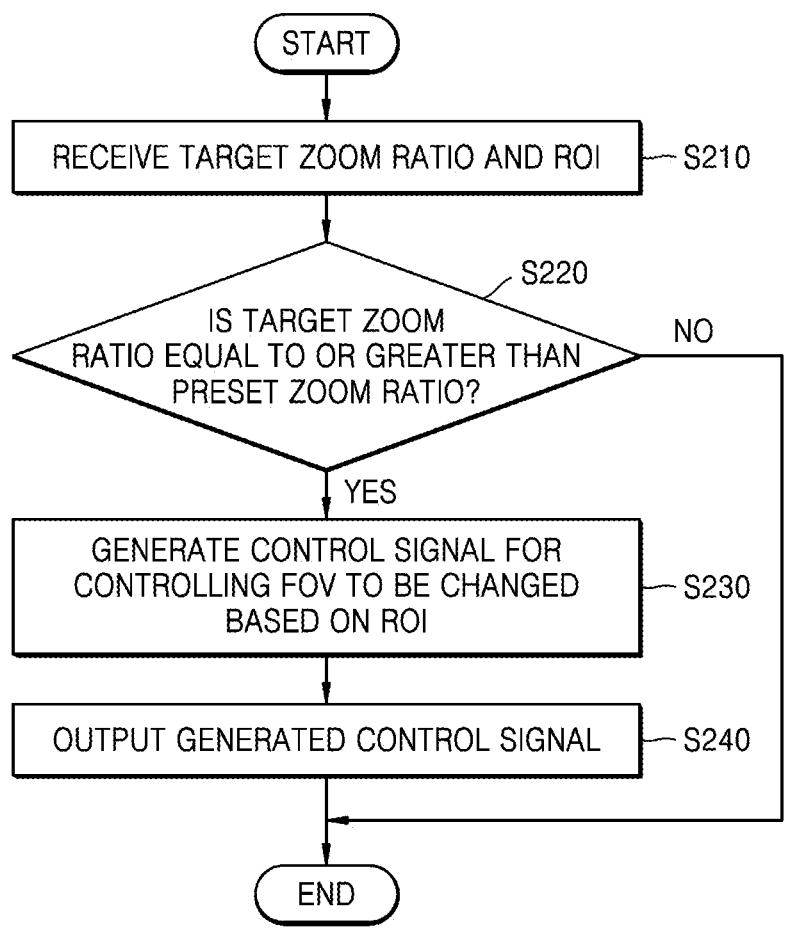
FIG. 9 is a flowchart illustrating an operation of generating a control signal of a camera module controller according to example embodiments.

FIG. 9 is a flowchart illustrating an operation of generating the control signal CTRL of the camera module controller 1230 according to example embodiments.

Referring to FIG. 9, in operation S210, the camera module controller 1230 may receive a target zoom ratio and an ROI. In some example embodiments, the camera module controller 1230 may receive zoom information Info_Z including a target zoom ratio and an ROI from the zoom information generator 1250.

In addition, in operation S220, the camera module controller 1230 may check whether the target zoom ratio is equal to or greater than a preset zoom ratio. The preset zoom ratio may have a value equal to or less than a zoom ratio (e.g., 5.0×) at which camera module conversion is performed from the first camera module 1100a to the second camera module 1100b.

When the target zoom ratio is equal to or greater than the preset zoom ratio (YES in operation S220), in operation S230, the camera module controller 1230 may generate a control signal CTRL for controlling an FoV to be changed based on the ROI. For example, the camera module controller 1230 may calculate coordinates of a center point of the ROI. In addition, the camera module controller 1230 may check arrangement information of the prism 1105 of the second camera module 1100b corresponding to the calculated coordinates of the center point. In addition, the camera module controller 1230 may generate a control signal CTRL including the checked arrangement information. However, the disclosure is not limited to the above-described example, and the control signal CTRL may be generated in various ways.

When the target zoom ratio is relatively small, the converted image data CDT is generated based on the first image data IDT1 of the first camera module 1100a. Therefore, according to example embodiments, the second camera module 1100b may be implemented to be off when the target zoom ratio is less than the preset zoom ratio. In some example embodiments, the camera module controller 1230 may additionally generate a control signal CTRL for turning on the second camera module 1100b when the target zoom ratio is equal to or greater than the preset zoom ratio.

In addition, in operation S240, the camera module controller 1230 may output the generated control signal CTRL. For example, the camera module controller 1230 may output the generated control signal CTRL to the second camera module 1100b through an I2C bus connected to the second camera module 1100b. The second camera module 1100b may adjust the arrangement of the prism 1105 based on the arrangement information of the prism 1105 included in the control signal CTRL.

On the other hand, when the target zoom ratio is less than the preset zoom ratio (NO in S220), the camera module controller 1230 may end the operation without generating the control signal CTRL. When the preset zoom ratio is 1.0×, which is a default zoom ratio, there is no case where the target zoom ratio is less than the preset zoom ratio. Therefore, the camera module controller 1230 may continuously generate the control signal CTRL.

Figure 10:
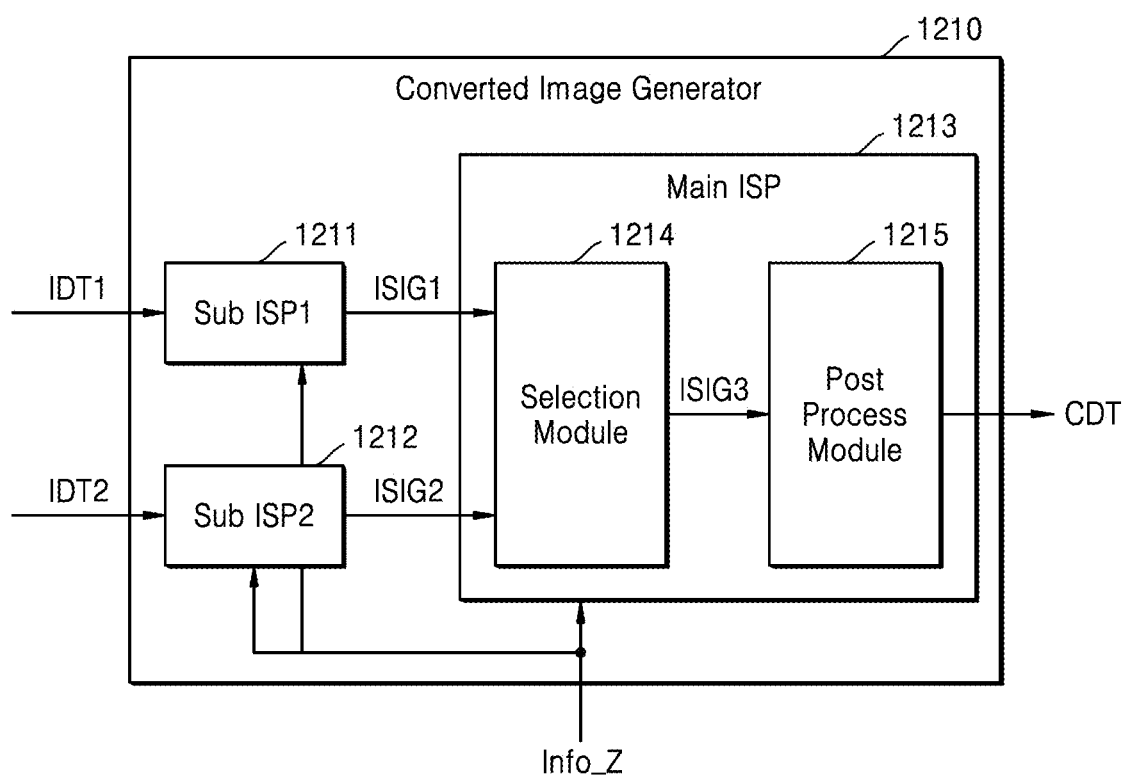
FIG. 10 is a block diagram of a detailed configuration of a converted image generator according to example embodiments.

FIG. 10 is a block diagram of a detailed configuration of the converted image generator 1210 according to example embodiments.

Referring to FIG. 10, the converted image generator 1210 may include a first sub image signal processor (ISP) 1211, a second sub ISP 1212, and/or a main ISP 1213. In an example, the main ISP 1213 may include a selection module 1214 and/or a post-processing module 1215.

The first sub ISP 1211 and the second sub ISP 1212 may generate a first image signal ISIG1 and a second image signal ISIG2 by performing image processing on the first image data IDT1 and the second image data IDT2. In an example, the first sub ISP 1211 and the second sub ISP 1212 may generate the first image signal ISIG1 and the second image signal ISIG2 by performing an image scale operation on the first image data IDT1 and the second image data IDT2.

In some example embodiments, the first sub ISP 1211 and the second sub ISP 1212 may receive the zoom information Info_Z from the zoom information generator 1250, may generate a cropped area by cropping an image area corresponding to an ROI of the first image data IDT1 and the second image data IDT2 using the zoom information Info_Z, and may generate the first image signal ISIG1 and the second image signal ISIG2 by changing a scale of the cropped area to have a resolution corresponding to a target zoom ratio.

Example embodiments in which each of the first sub-ISP 1211 and the second sub-ISP 1212 performs a cropping operation and a scaling operation using the zoom information Info_Z may be different.

For example, when a target zoom level of the zoom information Info_Z is within a first zoom ratio range (e.g., 1.0× or more and less than 5.0×), the first sub ISP 1211 may generate a cropped area by cropping an image area corresponding to an ROI of the zoom information Info_Z from the first image data IDT1, and may generate the first image signal ISIG1 by scaling the cropped area to have a resolution corresponding to a target zoom ratio. In addition, when the target zoom level is within a second zoom ratio range (e.g., 5.0× or more), the first sub ISP 1211 may downscale the first image data IDT1 to a preset resolution regardless of an ROI to generate the first image signal ISIG1.

The second sub ISP 1212 may generate a cropped area by cropping an image area corresponding to an ROI from the second image data IDT2 regardless of the target zoom level of the zoom information Info_Z, and may generate the second image signal ISIG2 by scaling the cropped area to have a resolution corresponding to a target zoom ratio. Alternatively, the second sub ISP 1212 may be implemented to generate the second image signal ISIG2 by performing a cropping operation and a scaling operation only when the target zoom level is within the second zoom ratio range (e.g., 5.0× or more).

In other example embodiments, when the target zoom level is a zoom ratio (e.g., 5.0×) that corresponds to a boundary between the first zoom ratio range and the second zoom ratio range, the first sub ISP 1211 and the second sub ISP 1212 may generate the first image signal ISIG1 by scaling an ROI with respect to the first image data IDT1 and may generate the second image signal ISIG2 with respect to the second image data IDT2. In some example embodiments, because the first sub ISP 1211 and the second sub ISP 1212 generate image signals representing the same ROI at the zoom ratio corresponding to the boundary, the first sub ISP 1211 and the second sub ISP 1212 may be overlapped with each other by the main ISP 1213 to be described later below.

In addition to the above-described image scale operation, each of the first sub-ISP 1211 and the second sub-ISP 1212 may perform additional image processing operations such as collecting statistics of auto-exposure (AE), auto-focus (AF), and auto-white balance (AWB) or changing an image format. In a non-limiting example, when receiving the first image data IDT1 and the second image data IDT2, which are raw images having a Bayer pattern, the first sub ISP 1211 and the second sub ISP 1212 may generate the first image signal ISIG1 and the second image signal ISIG2 by performing a demosiac operation. In addition to this, according to example embodiments, the first sub-ISP 1211 and the second sub-ISP 1212 may change image data of an RGB format to a YUV format, or may also process a raw image having a Tetra pattern in which pixels of RGB colors are repeatedly arranged in 2_2 rows.

In an example, the main ISP 1213 may include the selection module 1214 and the post-processing module 1215. The selection module 1214 may receive the first image signal ISIG1 and the second image signal ISIG2 from the first sub ISP 1211 and the second sub ISP 1212, respectively. In addition, the selection module 1214 may select at least one of the first image signal ISIG1 and the second image signal ISIG2 based on a target zoom ratio of the zoom information Info_Z, and may provide the selected image signal as a third image signal ISIG3 to the post-processing module 1215.

Further, the post-processing module 1215 may generate the converted image data CDT by performing an additional image processing operation on the received third image signal ISIG3. In a non-limiting example, the post-processing module 1215 may perform various image processing operations, such as defective pixel correction, offset correction, lens distortion correction, color gain correction, shading correction, gamma correction, denoising, and sharpening, on the third image signal ISIG3. Some of the above-described post-processing operations may be omitted depending on the performance of the first camera module 1100a or the second camera module 1100b. For example, when the first camera module 1100a or the second camera module 1100b includes a high-quality image sensor, the defective pixel correction or the offset correction may be omitted during the post-processing operation.

In an example, the selection module 1214 may select the first image signal ISIG1 when the target zoom ratio is within the first zoom ratio range (e.g., 1.0× or more and less than 5.0×). In addition, the selection module 1214 may provide the first image signal ISIG1 as the third image signal ISIG3 to the post-processing module 1215. The post-processing module 1215 may perform a post-processing operation on the received first image signal ISIG1 to generate the converted image data CDT.

In addition, the selection module 1214 may select the second image signal ISIG2 when the target zoom ratio is within the second zoom ratio range (e.g., 5.0× or more). In addition, the selection module 1214 may provide the second image signal ISIG2 as the third image signal ISIG3 to the post-processing module 1215. The post-processing module 1215 may perform a post-processing operation on the received second image signal ISIG2 to generate the converted image data CDT.

However, according to other example embodiments, when the target zoom ratio is within the second zoom ratio range (e.g., 5.0× or more), the selection module 1214 may select both the first image signal ISIG1 and the second image signal ISIG2. In addition, the selection module 1214 may provide the first image signal ISIG1 and the second image signal ISIG2 to the post-processing module 1215. In addition, the post-processing module 1215 may merge the received first image signal ISIG1 with the second image signal ISIG2, and may perform a post-processing operation to generate the converted image data CDT. In a non-limiting example, the post-processing module 1215 may merge a downscaled first image signal ISIG1 in a manner that overlaps a lower left of an image area of the second image signal ISIG2, and may perform a post-processing operation to generate the converted image data CDT.

Each of the selection module 1214 and the post-processing module 1215 may be implemented with software or hardware, or a combination of software and hardware such as firmware. When the selection module 1214 or the post-processing module 1215 is implemented with software, each of the above-described functions may be implemented as programmed source code and loaded into a memory provided inside or outside the converted image generator 1210. In addition, the functions of the selection module 1214 and the post-processing module 1215 may be implemented by the main ISP 1213 executing the software. When the selection module 1214 or the post-processing module 1215 is implemented with hardware, the selection module 1214 or the post-processing module 1215 may include a logic circuit and a register, and may perform each of the above-described functions based on register setting.

It is assumed that the converted image generator 1210 of FIG. 1 includes the first sub ISP 1211, the second sub ISP 1212, and the main ISP 1213 in showing and describing FIG. 10. However, the converted image generator 1210 includes only at least some of the first sub-ISP 1211, the second sub-ISP 1212, and the main ISP 1213, and the remaining configurations may be implemented as individual configurations.

Figure 11:
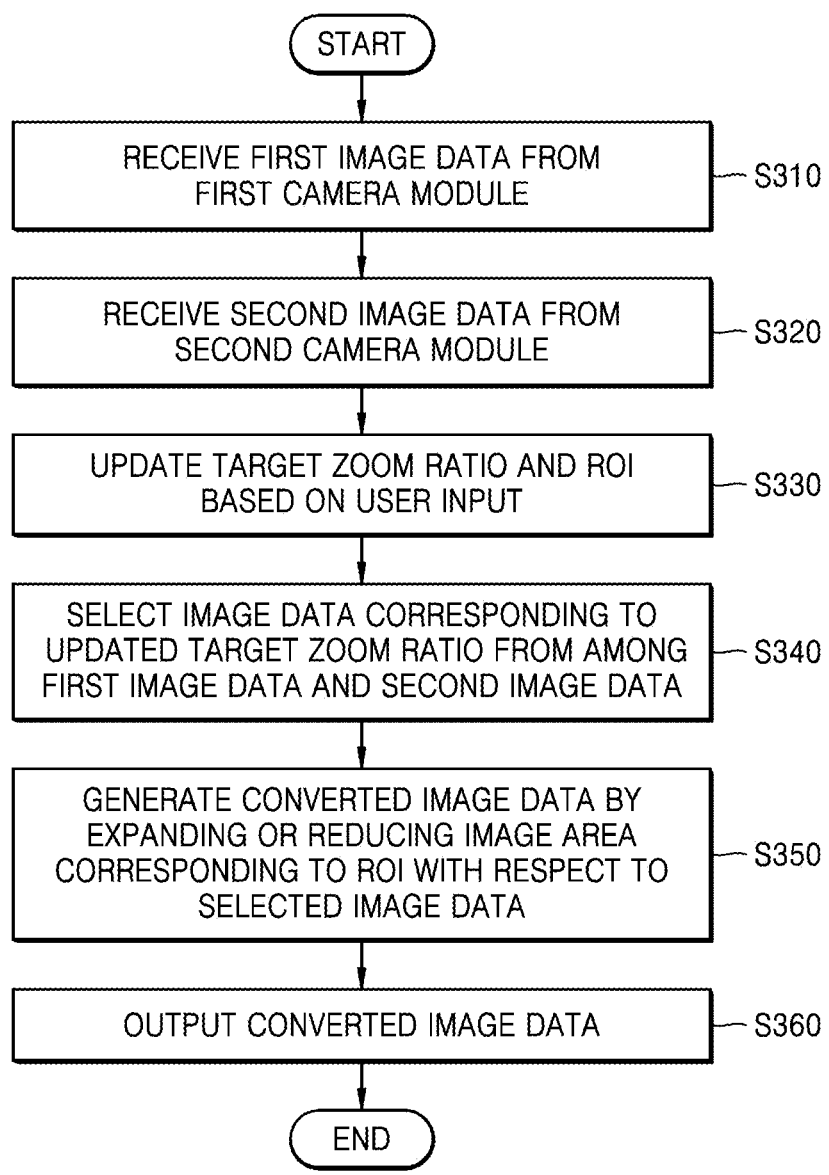
FIG. 11 is a flowchart illustrating an operation of an image processing device according to example embodiments.

FIG. 11 is a flowchart illustrating an operation of the image processing device 1200 according to example embodiments.

Referring to FIGS. 1 to 11, in operation S310, the image processing device 1200 may receive the first image data IDT1 from the first camera module 1100a. In addition, in operation S320, the image processing device 1200 may receive the second image data IDT2 from the second camera module 1100b. In an example, the first camera module 1100a may have a wide angle, and the second camera module 1100b may have a narrow angle.

In operation S330, the image processing device 1200 may update a target zoom ratio and an ROI based on a user input. For example, the image processing device 1200 may calculate a target zoom ratio and an ROI based on a user input that is a touch gesture related to a zoom function, and may update the existing target zoom ratio and ROI using the calculated target zoom ratio and ROI.

In operation S340, the image processing device 1200 may select image data corresponding to the updated target zoom ratio from among the first image data IDT1 and the second image data IDT2. In addition, in operation S350, the image processing device 1200 may generate the converted image data CDT by expanding or reducing an image area corresponding to the ROI with respect to the selected image data. In addition, in operation S360, the image processing device 1200 may output the converted image data CDT.

Figure 12A:
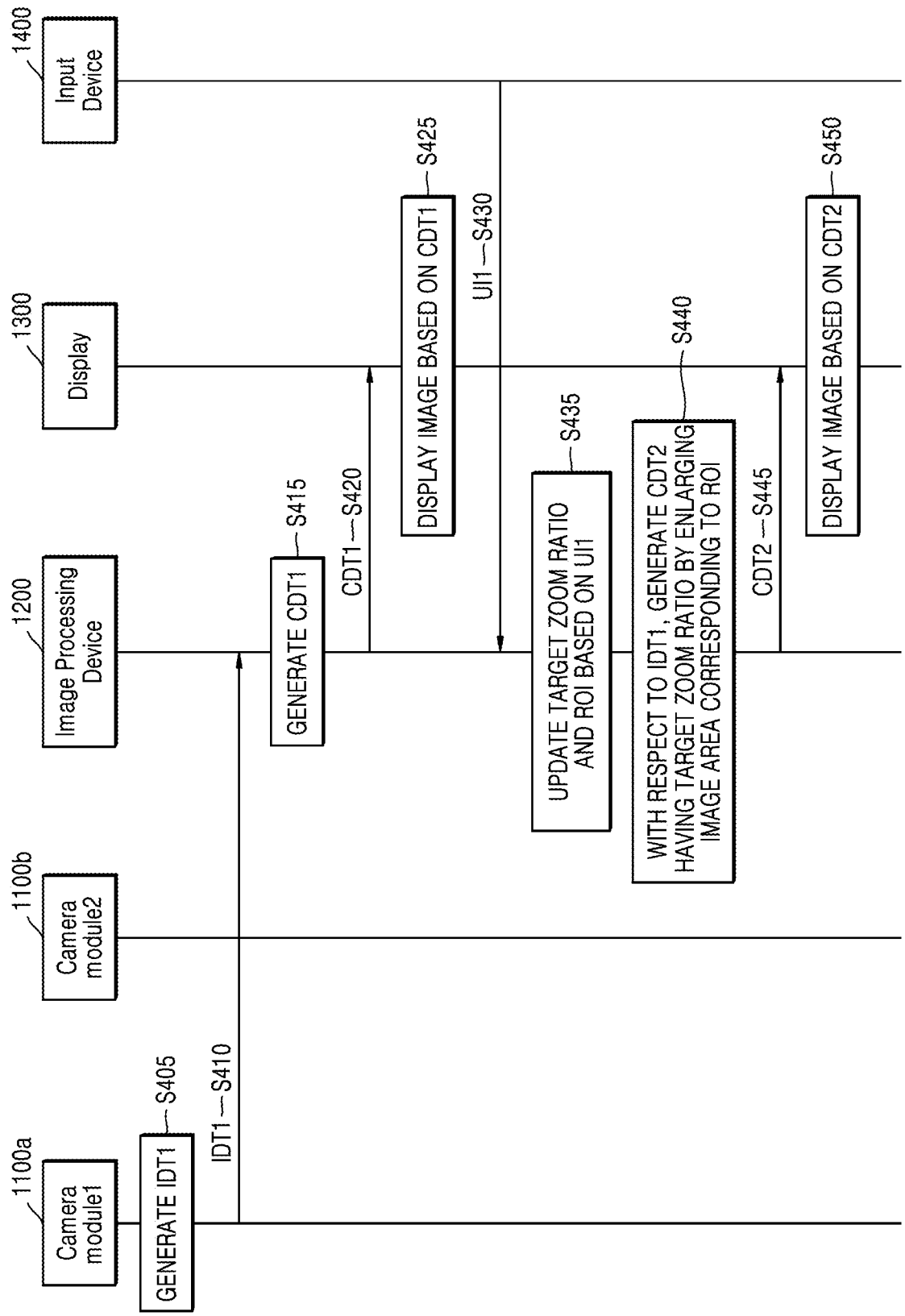
Figure 12B:
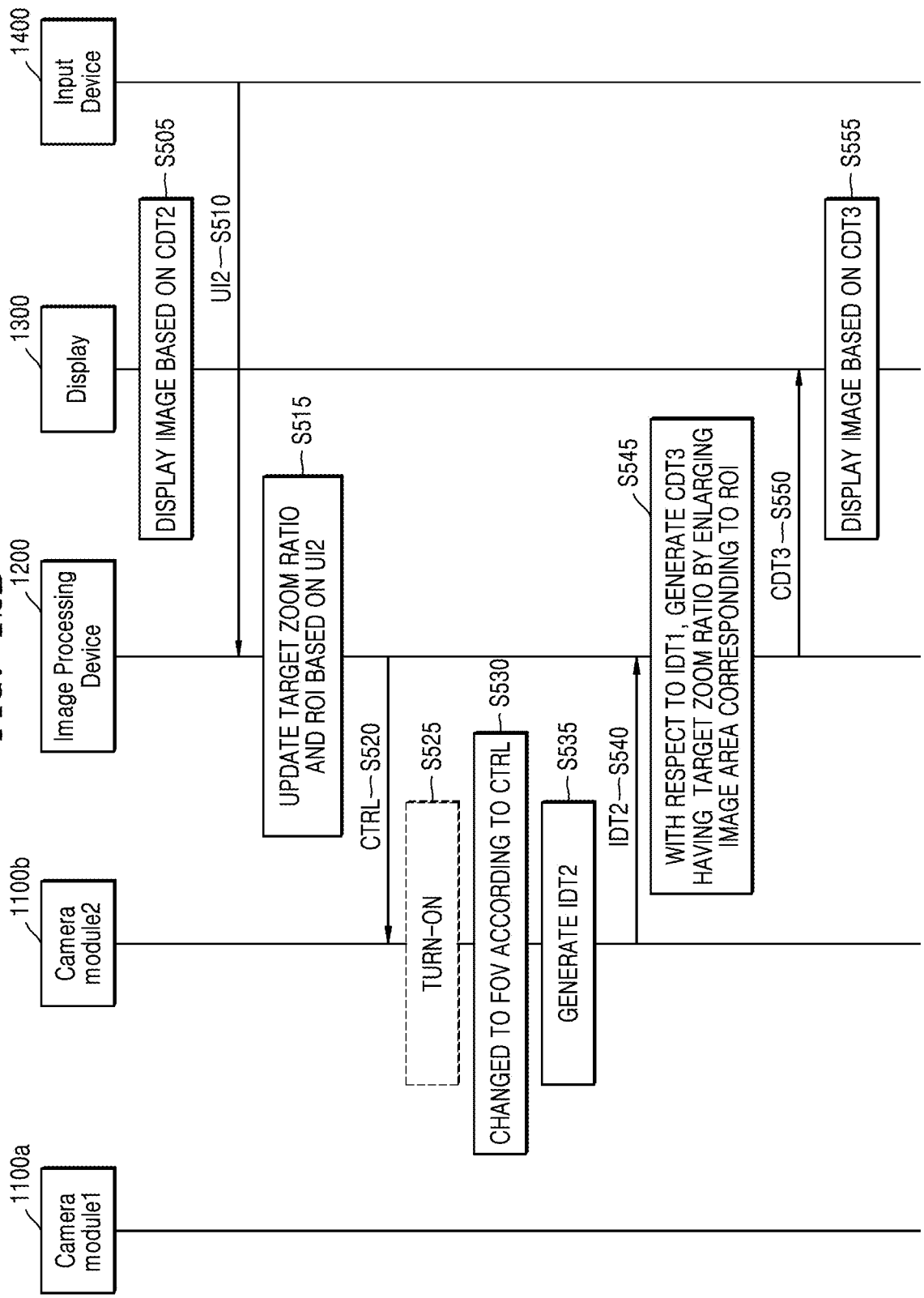
Figure 12D:
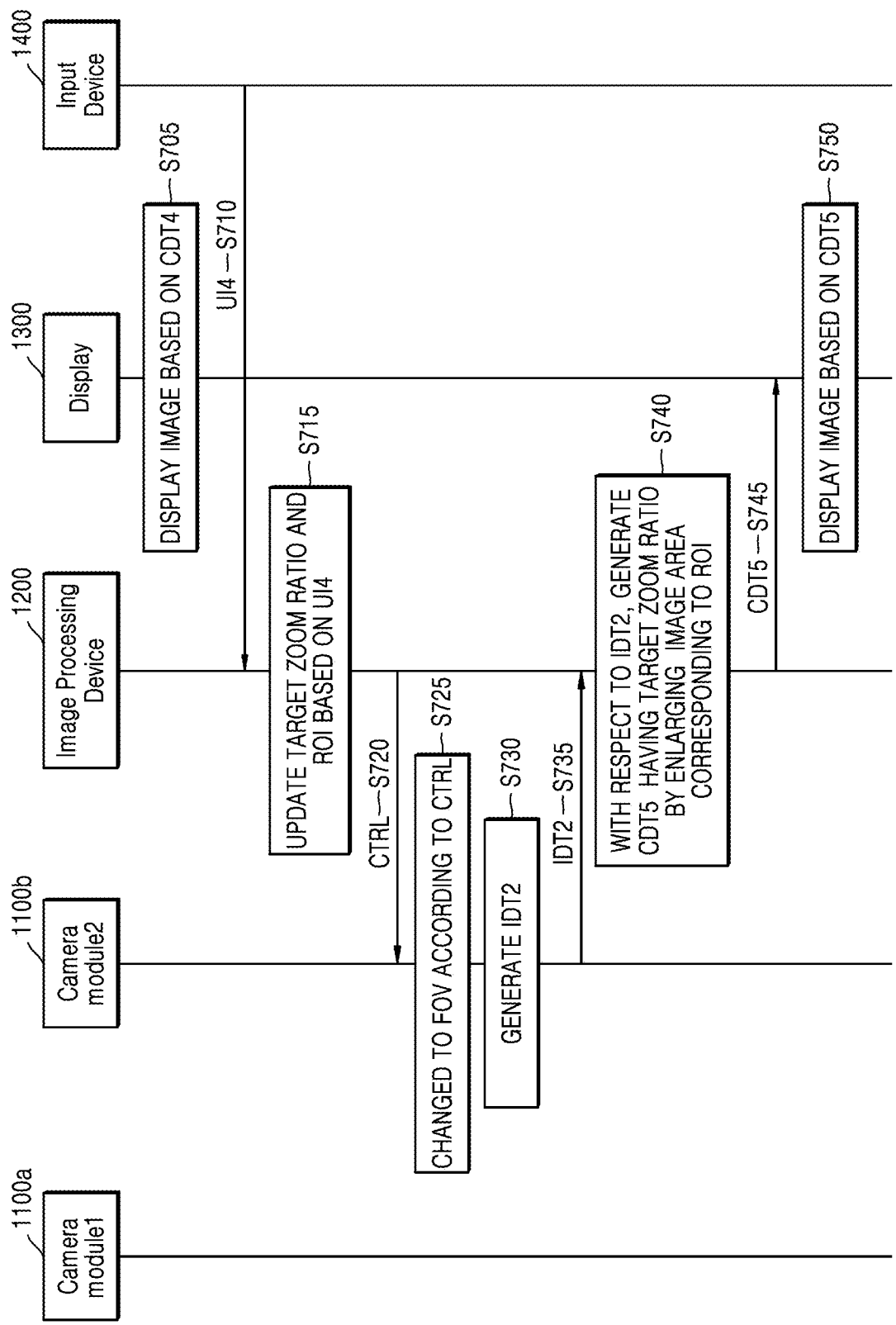

FIGS. 12A to 12E are sequence diagrams illustrating operations between components of the electronic device 1000 performing a zoom function. Hereinafter, referring to FIGS. 12A to 12E, a scenario in which a target zoom ratio gradually increases according to a user's input while the electronic device 1000 performs a zoom function will be described. FIG. 12A is a view illustrating a scenario when the target zoom ratio is 1.0× or more and less than 3.0×, FIG. 12B is a view illustrating a scenario when the target zoom ratio is 3.0× or more and less than 5.0×, FIG. 12C is a view illustrating a scenario when the target zoom ratio is 5.0×, FIG. 12D is a view for explaining a scenario when the target zoom ratio exceeds 5.0×, and FIG. 12E is a view illustrating another scenario when the target zoom ratio exceeds 5.0×. In describing a scenario in which the target zoom ratio gradually increases, the target zoom ratios used as the reference, that is, 1.0×, 3.0×, and 5.0×, are only examples. According to example embodiments, other zoom ratios may be used.

Referring to FIG. 12A, in operation S405, the first camera module 1100a having a wide angle may generate the first image data IDT1. In addition, in operation S410, the first camera module 1100a may transmit the first image data IDT1 to the image processing device 1200. In some example embodiments, the first camera module 1100a may repeatedly generate new first image data IDT1 according to a preset frame rate, and may repeatedly transmit the generated first image data IDT1 to the image processing device 1200. Hereinafter, in order to reduce or prevent repeated descriptions, the descriptions of the first camera module 1100a repeatedly generating the first image data IDT1 will be omitted. In the some example embodiments, the second camera module 1100b may be in an off state.

In operation S415, the image processing device 1200 may generate first converted image data CDT1 based on the first image data IDT1. In some example embodiments, the image processing device 1200 may generate the first converted image data CDT1 by using a zoom parameter including a target zoom ratio and an ROI. In some example embodiments, the zoom parameter may have default values, and for example, the target zoom ratio may be 1.0×. In operation S420, the image processing device 1200 may transmit the first converted image data CDT1 to the display 1300. In operation S425, the display 1300 may display an image based on the first converted image data CDT1.

In operation S430, the input device 1400 may provide a touch gesture (e.g., pinch-out) input from a user to the image processing device 1200 as a first user input UI1. In an example, the input device 1400 may be a touch panel combined with the display 1300. In operation S435, the image processing device 1200 may update the target zoom ratio and the ROI based on the received first user input UI1. For example, the updated target zoom ratio may be 2.0×.

In operation S440, the image processing device 1200, with respect to the first image data IDT1 in the following order, may generate second converted image data CDT2 having a target zoom ratio (e.g., 2.0×) by enlarging an image area corresponding to the ROI. In operation S445, the image processing device 1200 may transmit the generated second converted image data CDT2 to the display 1300. In operation S450, the display 1300 may display an image based on the second converted image data CDT2.

Thereafter, referring to FIG. 12B, in operation S505 (operation S450 of FIG. 12A), the display 1300 may display an image based on the second converted image data CDT2. In operation S510, the input device 1400 may provide a touch gesture (e.g., pinch-out) input from a user to the image processing device 1200 as a second user input UI2. In operation S515, the image processing device 1200 may update the target zoom ratio and the ROI based on the received second user input UI2. For example, the updated target zoom ratio may be 4.0×.

In operation S520, the image processing device 1200 may transmit the control signal CTRL to the second camera module 1100b having a narrow angle. In some example embodiments, when the updated target zoom ratio exceeds a preset zoom ratio (e.g., 3.0×), the image processing device 1200 may generate a control signal CTRL for controlling the second camera module 1100b and may transmit the control signal CTRL. The control signal CTRL may include an instruction for changing an FoV of the second camera module 1100b to an FoV corresponding to the updated ROI. According to example embodiments, the control signal CTRL may include an instruction to turn on the second camera module 1100b. In some example embodiments, in operation S525, the second camera module 1100b may be turned on according to the turn-on instruction.

In operation S530, the second camera module 1100b may be changed to an FoV corresponding to the ROI according to the control signal CTRL. In addition, in operation S535, the second camera module 1100b may generate the second image data IDT2. In operation S540, the second camera module 1100b may transmit the second image data IDT2 to the image processing device 1200. In some example embodiments, the second camera module 1100b may repeatedly generate new second image data IDT2 according to a preset frame rate, and may repeatedly transmit the generated second image data IDT2 to the image processing device 1200. Hereinafter, in order to reduce or prevent repeated descriptions, the descriptions of the second camera module 1100b repeatedly generating the second image data IDT2 will be omitted.

In operation S545, the image processing device 1200, with respect to the first image data IDT1, may generate third converted image data CDT3 having a target zoom ratio (e.g., 4.0×) by enlarging an image area corresponding to the ROI. Even if the image processing device 1200 receives the second image data IDT2, it is not used to generate the third converted image data CDT3, but may be used to perform basic setting of an image processing operation such as a defective pixel detection operation. In operation S550, the image processing device 1200 may transmit the generated third converted image data CDT3 to the display 1300. In operation S560, the display 1300 may display an image based on the third converted image data CDT3.

Thereafter, referring to FIG. 12C, in operation S605 (operation S560 of FIG. 12B), the display 1300 may display an image based on the third converted image data CDT3. In operation S610, the input device 1400 may provide a touch gesture (e.g., pinch-out) input from a user to the image processing device 1200 as a third user input UI3. In operation S615, the image processing device 1200 may update the target zoom ratio and the ROI based on the received third user input UI3. For example, the updated target zoom ratio may be 5.0×.

In operation S620, the image processing device 1200 may transmit the control signal CTRL to the second camera module 1100b having a narrow angle. The control signal CTRL may include an instruction for changing an FoV of the second camera module 1100b to an FoV corresponding to the updated ROI. In operation S625, the second camera module 1100b may be changed to an FoV corresponding to the ROI according to the control signal CTRL. In addition, in operation S630, the second camera module 1100b may generate the second image data IDT2. In operation S635, the second camera module 1100b may transmit the second image data IDT2 to the image processing device 1200.

In operation S640, the image processing device 1200, with respect to the first image data IDT1, may generate third image data IDT3 having a target zoom ratio (e.g., 5.0×) by enlarging an image area corresponding to the ROI. In operation S645, the image processing device 1200 may generate fourth image data IDT4 corresponding to the ROI and having a target zoom ratio with respect to the second image data IDT2. When a basic zoom ratio of the second camera module 1100b is 5.0×, a scale operation for the second image data IDT2 may be omitted.

In operation S650, the image processing device 1200 may generate fourth converted image data CDT4 by synthesizing the third image data IDT3 and the fourth image data IDT4. When the target zoom ratio is changed from less than 5.0× to more than 5.0×, an image scaled based on the first image data IDT1 is displayed and then an image scaled based on the second image data IDT2 is displayed, and thus, natural image conversion is required. Accordingly, when the target zoom ratio is 5.0×, the image processing device 1200 may perform image warping on the third image data IDT3 and the fourth image data IDT4 to generate the fourth converted image data CDT4.

However, the disclosure is not limited thereto, and according to example embodiments, the image processing device 1200 may generate the fourth converted image data CDT4 using only the fourth image data IDT4. That is, the image warping operation of the third image data IDT3 and the fourth image data IDT4 may be omitted.

In operation S655, the image processing device 1200 may transmit the generated fourth converted image data CDT4 to the display 1300. In operation S660, the display 1300 may display an image based on the fourth converted image data CDT4.

Because there is no zoom ratio in which a first zoom ratio range (e.g., a zoom ratio less than 5.0×) and a second zoom ratio range (e.g., a zoom ratio 5.0 or higher) overlap each other, it has been illustrated and described that the above-described operations are performed only at a zoom ratio of 5.0× corresponding to a boundary between the ranges in FIG. 12C, but the disclosure is not limited thereto. For example, the first zoom ratio range and the second zoom ratio range may be implemented to have a zoom ratio range in which the first zoom ratio range overlaps the second zoom ratio range, and to generate the fourth converted image data CDT4 by overlapping the first image data IDT1 and the second image data IDT2 that are scaled in the zoom ratio range in which the first zoom ratio range overlaps and the second zoom ratio range.

Subsequently, referring to FIG. 12D, in operation S705 (S660 in FIG. 12C), the display 1300 may display an image based on the fourth converted image data CDT4. In operation S710, the input device 1400 may provide a touch gesture (e.g., pinch-out) input from a user to the image processing device 1200 as a fourth user input UI4. In operation S715, the image processing device 1200 may update the target zoom ratio and the ROI based on the received fourth user input UI4. For example, the updated target zoom ratio may be 6.0×.

In operation S720, the image processing device 1200 may transmit the control signal CTRL to the second camera module 1100b having a narrow angle. The control signal CTRL may include an instruction for changing an FoV of the second camera module 1100b to an FoV corresponding to the updated ROI. In operation S725, the second camera module 1100b may be changed to an FoV corresponding to the ROI according to the control signal CTRL. In addition, in operation S730, the second camera module 1100b may generate the second image data IDT2. In operation S735, the second camera module 1100b may transmit the second image data IDT2 to the image processing device 1200.

In operation S740, the image processing device 1200, with respect to the second image data IDT2, may generate fifth converted image data CDT5 having a target zoom ratio (e.g., 6.0×) by enlarging an image area corresponding to the ROI. In operation S745, the image processing device 1200 may transmit the generated fifth converted image data CDT5 to the display 1300. In operation S750, the display 1300 may display an image based on the fifth converted image data CDT5.

However, when the target zoom ratio exceeds 5.0×, the electronic device 1000 may generate converted image data in a different manner, as described with reference to FIG. 12E. Operations S805 to S835 of FIG. 12E may be the same or substantially the same as operations S705 to S735 of FIG. 12D, and thus, redundant descriptions will not be given herein.

Referring to FIG. 12E, in operation S840, the image processing device 1200 may generate fifth image data IDT5 having a preset resolution by using the first image data IDT1. The preset resolution may be set to be less than the original resolution of the first image data IDT1. That is, the image processing device 1200 may downscale the first image data IDT1 to the preset resolution to generate the fifth image data IDT5.

In operation S845, the image processing device 1200 may generate sixth image data IDT6 having a target zoom ratio by enlarging an image area corresponding to the ROI with respect to the second image data IDT2. In operation S850, the image processing device 1200 may generate sixth converted image data CDT6 by merging the fifth image data IDT5 and the sixth image data IDT6. In some example embodiments, the image processing device 1200 may generate the sixth converted image data CDT6 by overlapping the fifth image data IDT5 on the lower left of an image area of the sixth image data IDT6.

In operation S855, the image processing device 1200 may transmit the generated sixth converted image data CDT6 to the display 1300. In operation S860, the display 1300 may display an image based on the sixth converted image data CDT6.

However, the zoom ratios (e.g., 1.0×, 3.0×, and 5.0×) that distinguish the example embodiments of FIGS. 12A to 12E are only an example, and other zoom ratios may be used according to an implementation method. In addition, each of the example embodiments of FIGS. 12A to 12E may be selectively applied according to an implementation method of the electronic device 1000.

Figure 13A:
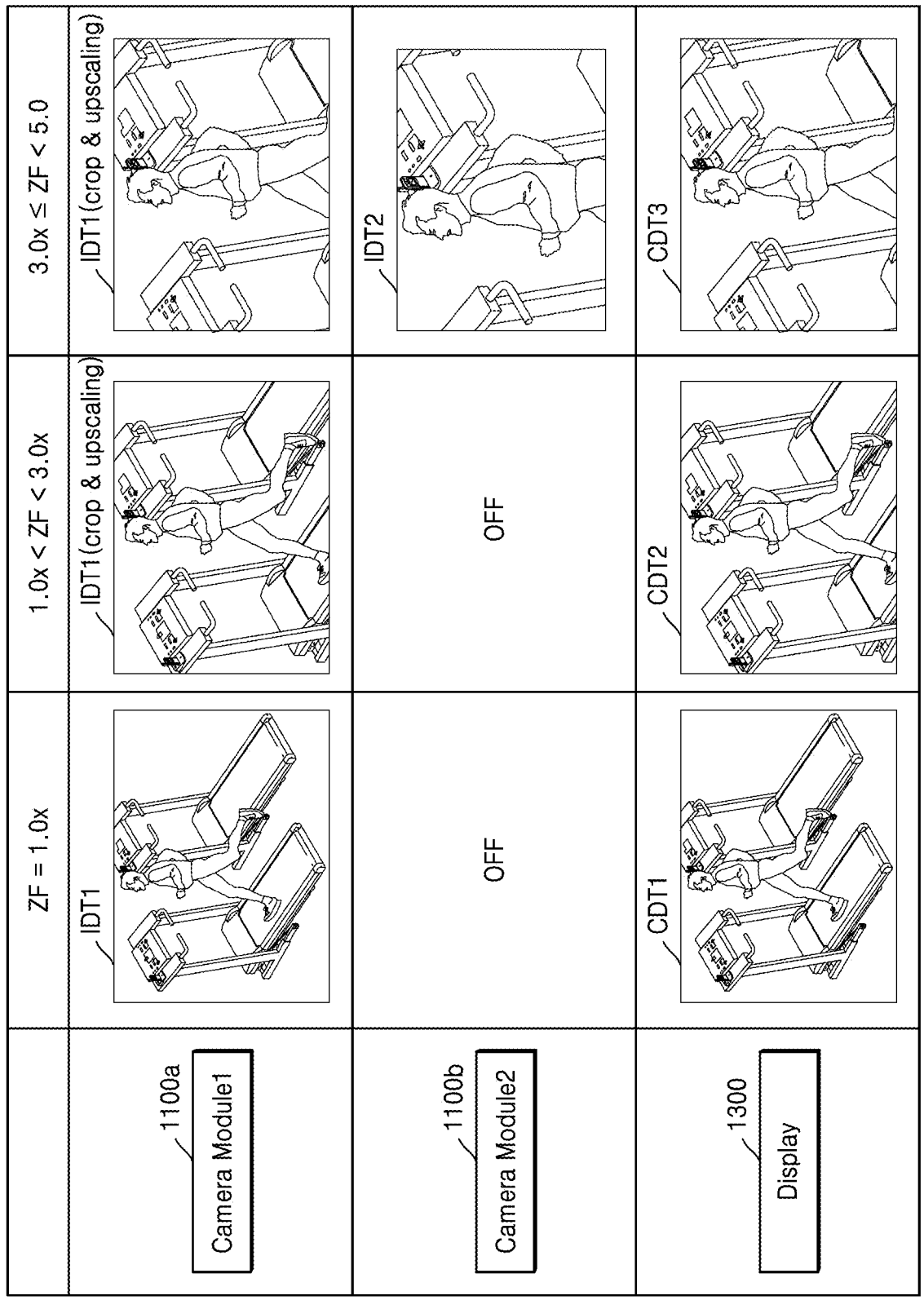

FIGS. 13A and 13B are views illustrating a result of scaling pieces of image data according to a zoom ratio and an output image of a display. In some example embodiments, FIGS. 13A and 13B are views illustrating a scaling result of the first image data IDT1 of the first camera module 1100a and the second image data IDT2 of the second camera module 1100b and an output image of the display 1300, according to a target zoom ratio based on the example embodiments of FIGS. 12A to 12E.

When a zoom function of the image processing device 1200 is first started, a zoom parameter may have default values. For example, the target zoom ratio may be 1.0×, which is a default value, and the ROI may be set to the same value as that of the entire image area of the first image data IDT1.

Referring to FIG. 13A, when the zoom function is started for the first time and the target zoom ratio is 1.0× (ZF=1.0×), the image processing device 1200 may receive the first image data IDT1 from the first camera module 1100a. On the other hand, when the target zoom ratio is less than a preset zoom ratio, for example, 3.0×, the second camera module 1100b may be turned off to reduce power consumption. The image processing device 1200 generates the first converted image data CDT1 by using the first image data IDT1. However, because an ROI is the entire image area of the first image data IDT1, which is a default value, the image processing device 1200 may generate the first converted image data CDT1 by performing a post-processing operation without a scaling operation. Further, a touch gesture related to a zoom function may be input from a user, and the target zoom ratio and the ROI may be updated based on the user input.

When the target zoom ratio exceeds 1.0× and is less than 3.0× (1.0×<ZF<3.0×), the image processing device 1200 may generate the second converted image data CDT2 using the first image data IDT1. The image processing device 1200 may generate the second converted image data CDT2 by scaling an area corresponding to the ROI in the first image data IDT1.

When the target zoom ratio exceeds 1.0× and is less than 3.0× (1.0×<ZF<3.0×), the image processing device 1200 may generate the third converted image data CDT3 using the first image data IDT1. The image processing device 1200 may generate the third converted image data CDT3 by scaling an area corresponding to the ROI in the first image data IDT1. However, because the target zoom ratio is a preset zoom ratio, for example, 3.0× or more, the second camera module 1100b may be turned on and adjusted to have an FoV corresponding to the ROI. In addition, the second camera module 1100b may output the second image data IDT2 including the ROI to the image processing device 1200. However, in the current operation, the image processing device 1200 does not perform scaling using the second image data IDT2, but may perform basic setting of an image processing operation.

Referring to FIG. 13B, when the target zoom ratio is 5.0× (ZF=5.0×), the image processing device 1200 may scale an area corresponding to the ROI of the first image data IDT1 and scale an area corresponding to the ROI of the second image data IDT2.

In addition, the image processing device 1200 may generate the fourth converted image data CDT4 by merging the scaled two pieces of image data. In some example embodiments, because the scaled two pieces of image data display the same ROI, the entire area may be merged in an overlapping manner.

When the optical zoom ratio of the second camera module 1100b is 5.0×, the scaling operation for the second image data IDT2 may be omitted, and the image processing device 1200 may generate the fourth converted image data CDT4 by merging the second image data IDT2 and the scaled first image data IDT1. Further, according to example embodiments, the image processing device 1200 may generate the fourth converted image data CDT4 using only the second image data IDT2.

When the target zoom ratio is 5.0× or higher (ZF≥5.0×), the image processing device 1200 may downscale the first image data IDT1 to a preset resolution and may scale an area corresponding to the ROI of the second image data IDT2. Further, the image processing device 1200 may generate the sixth converted image data CDT6 by merging the downscaled first image data IDT1 and the scaled second image data IDT2. For example, the image processing device 1200 may merge the downscaled first image data IDT1 and the scaled second image data IDT2 by overlapping the downscaled first image data IDT1 on at least a partial area of the scaled second image data IDT2. However, the disclosure is not limited thereto, and the image processing device 1200 may merge the downscaled first image data IDT1 and the scaled second image data IDT2 in a way that they are arranged side by side without overlapping.

On the other hand, in another example, when the target zoom ratio is 5.0× or more (ZF≥5.0×), the image processing device 1200 may generate converted image data by scaling only the second image data IDT2 without using the first image data IDT1 of the first camera module 1100a.

Figure 14A:
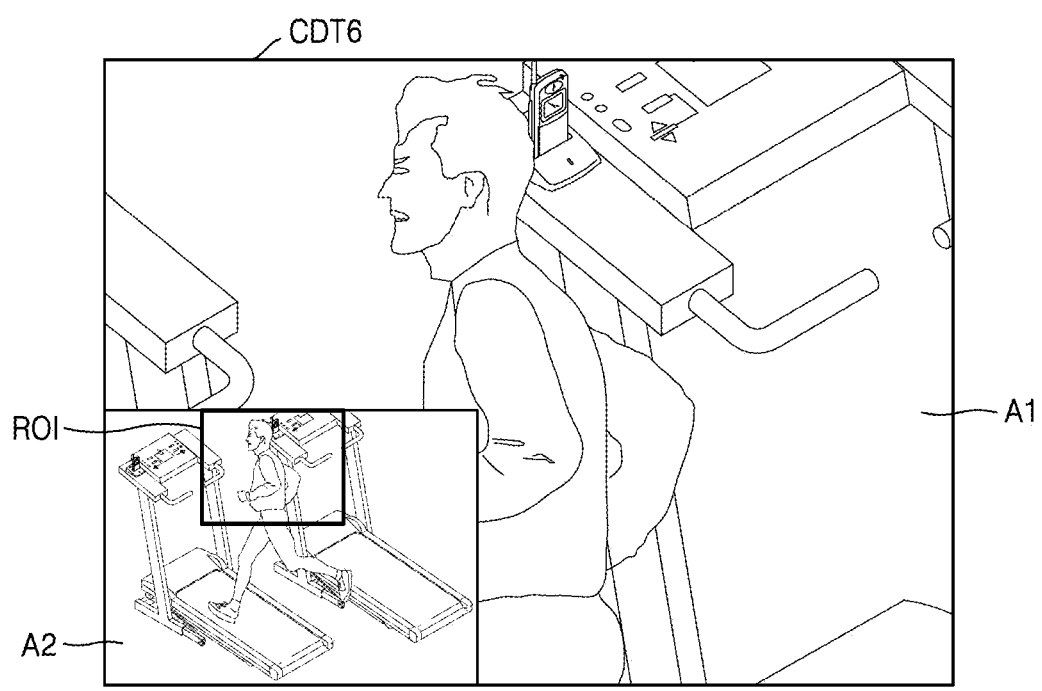
FIG. 14A is a view of an image displayed by a display at a high zoom ratio according to example embodiments.
Figure 14B:
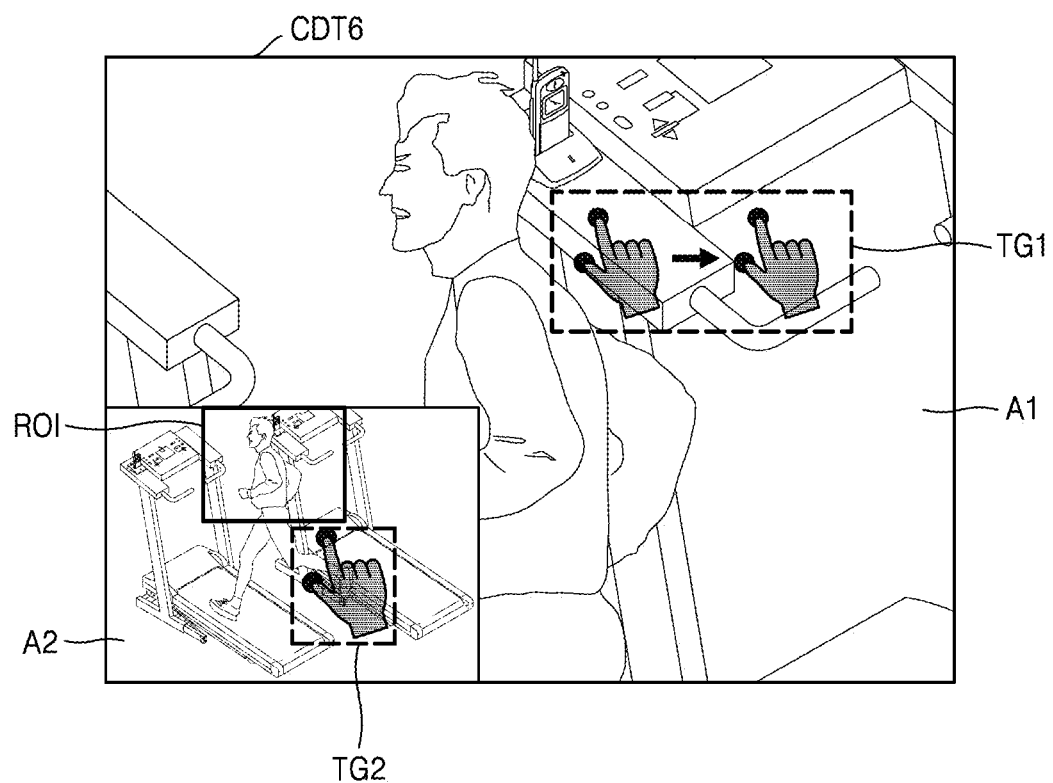
FIG. 14B is a view illustrating an operation of selecting an ROI by a user at a high zoom ratio.

FIG. 14A is a view of an image displayed by the display 1300 at a high zoom ratio according to example embodiments, and FIG. 14B is a view illustrating an operation of selecting an ROI by a user at a high zoom ratio.

In some example embodiments, FIG. 14A is a view illustrating an example in which the sixth converted image data CDT of FIG. 13B is displayed on the display 1300, and FIG. 14B is a view illustrating an operation of selecting an ROI from a user while displaying the sixth converted image data CDT of FIG. 13B.

Referring to FIG. 14A, the sixth converted image data CDT may include a first area A1 corresponding to the scaled second image data IDT2 and a second area corresponding to the downscaled first image data IDT1. A user may check an ROI enlarged by the user through the first area A1. In addition, the user may refer to the entire image area through the second area A2. In addition, in the second area A2, an ROI corresponding to the currently enlarged ROI may be displayed in a rectangular shape.

Referring to FIG. 14B, while the sixth converted image data CDT is displayed, the input device 1400 may receive a touch gesture related to a zoom function from a user. In addition, the image processing device 1200 may determine whether coordinates of the touch gesture are included in the first area A1 or the second area A2, and may apply a different method for selecting an ROI by a user according to a result of the determination.

In some example embodiments, the image processing device 1200 may set different touch gestures for selecting an ROI for each of the first area A1 and the second area A2. In addition, when a touch gesture for the first area A1 or the second area A2 is input, the image processing device 1200 may check the type of the touch gesture based on coordinate information of the touch gesture, and may determine whether the type of the checked touch gesture is a touch gesture for selecting an ROI from a corresponding area. When the checked touch gesture is a touch gesture for selecting an ROI, the image processing device 1200 may calculate an ROI based on coordinate information of the touch gesture according to the above-described methods.

For example, a first touch gesture TG1, which is a pinch drag, may be input to the first area A1. The image processing device 1200 may determine the type of the first touch gesture TG1 based on coordinate information of the first touch gesture TG1. Because the first touch gesture TG1 is a touch gesture (e.g., zoom-in, zoom-out, pinch drag, etc.) for selecting an ROI set for the first area A1, the image processing device 1200 may calculate an ROI based on the coordinate information of the first touch gesture TG1.

In addition, a second touch gesture TG2, which is a tap, may be input to the second area A2. The image processing device 1200 may determine the type of the second touch gesture TG2 based on coordinate information of the second touch gesture TG2. Because the second touch gesture TG2 is a touch gesture (e.g., zoom-in, zoom-out, tap, drag, etc.) for selecting an ROI set for the second area A2, the image processing device 1200 may calculate an ROI based on the coordinate information of the second touch gesture TG2.

In addition, the second touch gesture TG2, which is a drag, may be input to the second area A2. When checking that the second touch gesture TG2 is a drag, the image processing device 1200 may additionally check whether the drag, which is the second touch gesture TG2, starts from an ROI indicated by a rectangle. When the second touch gesture TG2 is a drag starting outside the area ROI indicated by a rectangle, the image processing device 1200 may determine that the second touch gesture TG2 is not a touch gesture for selecting an ROI.

Figure 15A:
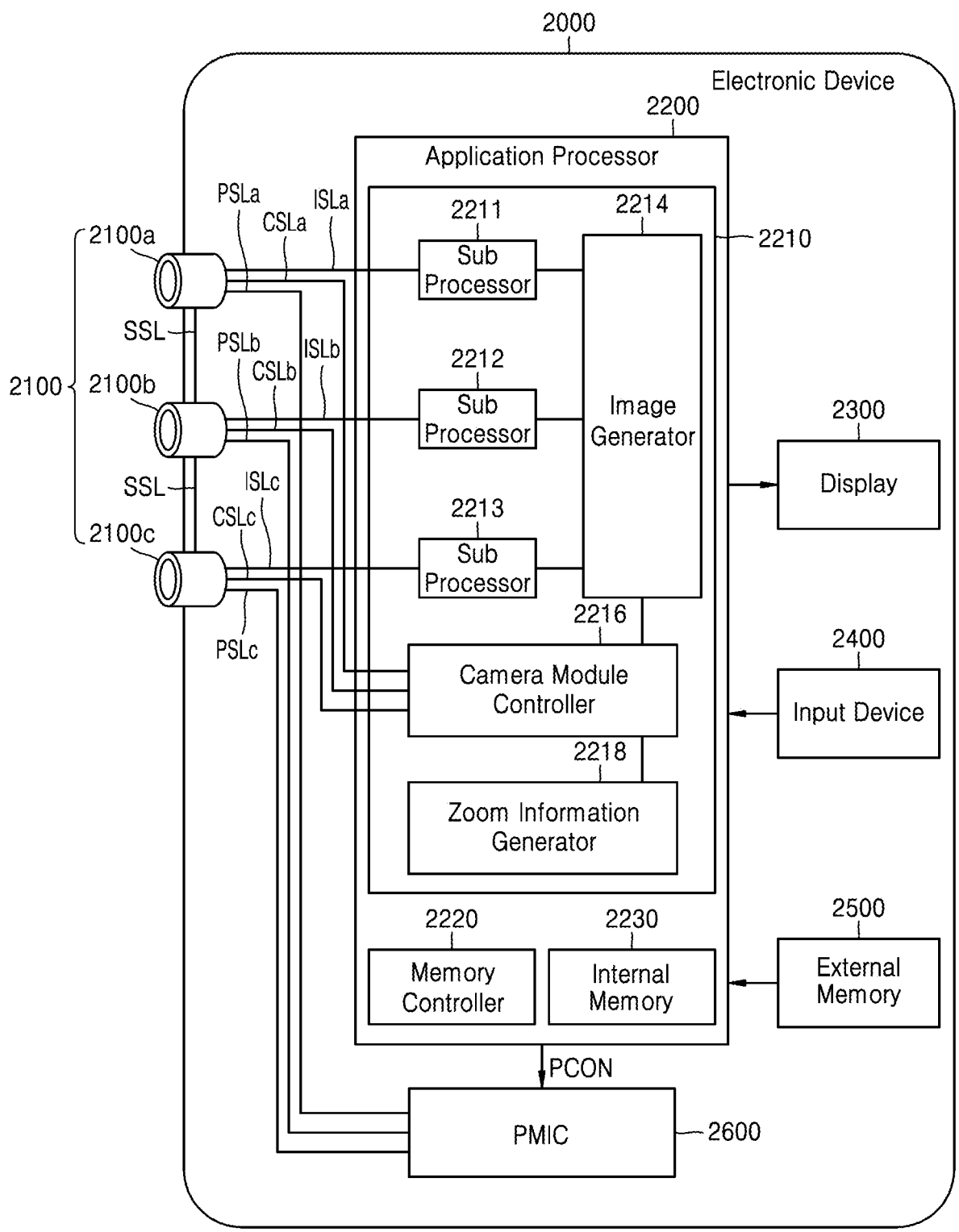
FIGS. 15A to 15C are block diagrams of an electronic device including an application processor according to example embodiments.
Figure 15B:
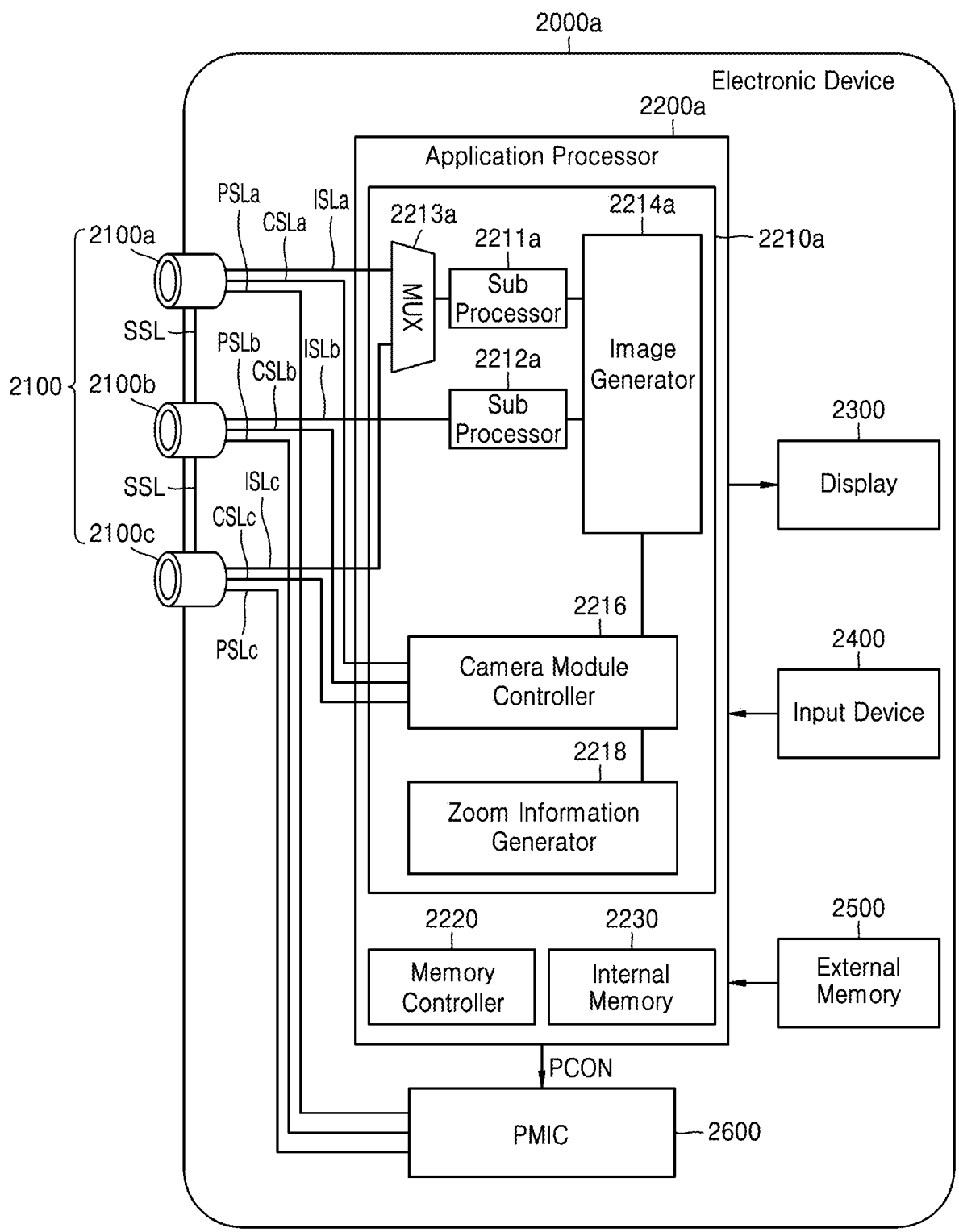
Figure 15C:
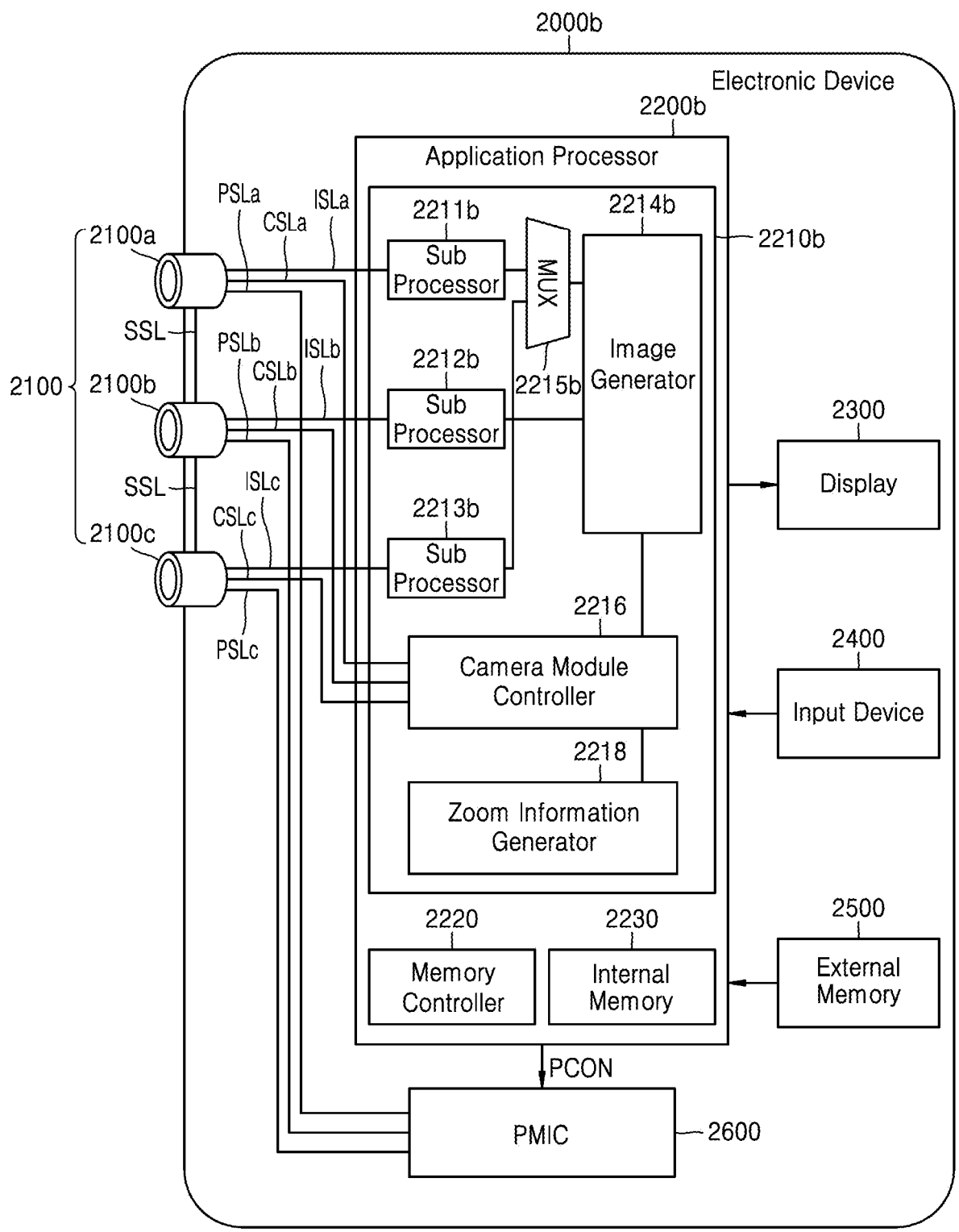

FIGS. 15A to 15C are block diagrams of electronic devices 2000, 2000a, and 2000b including application processors 2200, 2200a, and 2200b, respectively, according to example embodiments.

Referring to FIG. 15A, the electronic device 2000 may include a camera module group 2100, the application processor 2200, a display 2300, an input device 2400, an external memory 2500, and/or a PMIC (Power Management Integrated Circuit) 2600. In example embodiments, the application processor 2200 may include an image processing device 2210, a memory controller 2220, and/or an internal memory 2230.

The camera module group 2100 may include a plurality of camera modules 2100a, 2100b, and 2100c. The plurality of camera modules 2100a, 2100b, and 2100c may have different fields of view (FoVs). In an example, the first camera module 2100a may have the widest field of view, the second camera module 2100b may have an intermediate field of view, and the third camera module 2100c may have the narrowest field of view.

In addition, pieces of image data generated by the plurality of camera modules 2100a, 2100b, and 2100c may be set to correspond to different target zoom ratios. In a non-limiting example, the image data generated by the first camera module 2100a may be set to correspond to a target zoom ratio of less than 1.0×, the image data generated by the second camera module 2100b may be set to correspond to a target zoom ratio of 1.0× or more and less than 5.0×, and the image data generated by the third camera module 2100c may be set to correspond to a target zoom ratio of 5.0× or more.

In addition, each of the plurality of camera modules 2100a, 2100b, and 2100c may have the same or similar structure to the structures of the first camera module 1100a and the second camera module 1100b described above in FIG. 2. In an example, at least one of the plurality of camera modules 2100a, 2100b, and 2100c may be implemented as a folded camera including a prism, and the field of view may be adjusted by adjusting the arrangement of the prisms.

In an example, each of the plurality of camera modules 2100a, 2100b, and 2100c may be physically separated from each other and arranged. That is, a sensing area of one image sensor is not divided and used by the plurality of camera modules 2100a, 2100b, 2100c, but an independent image sensor may be arranged inside each of the plurality of camera modules 2100a, 2100b, and 2100c.

Although the drawing shows example embodiments in which three camera modules 2100a, 2100b, and 2100c are arranged, example embodiments are not limited thereto. In an example, the camera module group 2100 may be modified and implemented to include only two camera modules. In addition, in some example embodiments, the camera module group 2100 may be modified and implemented to include n (n is a natural number of 4 or more) camera modules.

The image processing device 2210 may include a plurality of sub-processors 2211, 2212, and 2213, an image generator 2214, a camera module controller 2216, and/or a zoom information generator 2218. The image processing device 2210 may include a plurality of sub-processors 2211, 2212, and 2213 corresponding to the number of the plurality of camera modules 2100a, 2100b, and 2100c.

Image data generated from each of the plurality of camera modules 2100a, 2100b, and 2100c may be provided to the corresponding sub-processors 2211, 2212, and 2213 through image signal lines ISLa, ISLb, and ISLc separated from each other. For example, the image data generated from the first camera module 2100a may be provided to the sub-processor 2211 through the image signal line ISLa, the image data generated from the second camera module 2100b may be provided to the sub-processor 2212 through the image signal line ISLb, and the image data generated from the third camera module 2100c may be provided to the sub-processor 2213 through the image signal line ISLc. Such image data transmission may be performed using, for example, a camera serial interface (CSI) based on a mobile industry processor interface (MIPI), but example embodiments are not limited thereto.

Each of the sub-processors 2211, 2212, and 2213 may operate similarly to the first sub-processor 1211 or the second sub-processor 1212 of FIG. 10. For example, each of the sub-processors 2211, 2212, and 2213 may receive zoom information from the zoom information generator 2218 and perform an image scaling operation on image data based on the received zoom information. For example, when the target zoom ratio is less than 1.0×, the sub-processor 2211 may scale an image area corresponding to an ROI in image data received from the first camera module 2100a. When the target zoom ratio is 1.0× or more and 5.0× or less, the sub-processor 2212 may scale an image area corresponding to the ROI in image data received from the second camera module 2100b. When the target zoom ratio is 5.0× or more, the sub-processor 2213 may scale an image area corresponding to the ROI in image data received from the third camera module 2100c.

Each of the sub-processors 2211, 2212, and 2213 may output image signals generated by performing a scaling operation to the image generator 2214. The image generator 2214 may operate similarly to the main ISP 1213 of FIG. 10. In an example, the image generator 2214 may generate converted image data by selecting one of received image signals based on zoom information, or may generate converted image data by merging two image signals.

In a non-limiting example, when the target zoom ratio is less than 1.0×, the image generator 2214 may generate converted image data based on an image signal received from the sub-processor 2211. In addition, when the target zoom ratio is 1.0× or more and less than 5.0×, the image generator 2214 may generate converted image data based on an image signal received from the sub-processor 2212. In addition, when the target zoom ratio is 5.0× or more, the image generator 2214 may generate converted image data based on an image signal received from the sub-processor 2213, or may generate converted image data by merging the image signal received from the sub-processor 2212 and the image signal received from the sub-processor 2213.

The camera module controller 2216 may provide control signals to the plurality of camera modules 2100a, 2100b, and 2100c through control lines CSLa, CSLb, and CSLc. The camera module controller 2216 may operate similarly to the camera module controller 1230 of FIG. 1. For example, the camera module controller 2216 may generate a control signal for controlling to change an FoV of at least one of the plurality of camera modules 2100a, 2100b, and 2100c based on a target zoom ratio and an ROI.

The zoom information generator 2218 may calculate a target zoom ratio and an ROI based on a touch gesture input through the input device 2400. In addition, the zoom information generator 2218 may provide zoom information including a zoom ratio and an ROI to the camera module controller 2216, the sub-processors 2211, 2212 and 2213, and the image generator 2214. The zoom information generator 2218 may operate similarly to the zoom information generator 1250 of FIG. 1.

The application processor 2200 may store received image data in an internal memory 2230 or an external memory 2500 of the application processor 2200, may read the image data from the internal memory 2230 or the external memory 2500, and may display an image generated based on the read image data.

The PMIC 2600 may supply power, such as a power voltage, to each of the plurality of camera modules 2100a, 2100b, and 2100c. For example, the PMIC 2600 may supply first power to the first camera module 2100a through a power signal line PSLa under the control of the application processor 2200, may supply second power to the second camera module 2100b through a power signal line PSLb, and may supply third power to the third camera module 2100c through a power signal line PSLc.

The PMIC 2600 may generate power corresponding to each of the plurality of camera modules 2100a, 2100b, and 2100c in response to a power control signal PCON from the application processor 2200, and may also adjust the level of power. The power control signal PCON may include a power adjustment signal for each operation mode of the plurality of camera modules 2100a, 2100b, and 2100c. For example, an operation mode may include a low power mode. In some example embodiments, the power control signal PCON may include information about a camera module operating in the low power mode and a set power level. Levels of powers respectively provided to the plurality of camera modules 2100a, 2100b, and 2100c may be the same or different from each other. In addition, the level of power may be dynamically changed.

According to other example embodiments, the application processor 2200a of FIG. 15B may include a smaller number of sub-processors 2211a and 2212a than the number of camera modules 2100a, 2100b, and 2100c, and/or a multiplexer 2215a. The multiplexer 2215a may receive pieces of image data from each of the first camera module 2100a and the third camera module 2100c, and may output one of the pieces of received image data to the sub-processor 2211a. In an example, the multiplexer 2215a may receive a target zoom ratio and output image data corresponding to the target zoom ratio to the sub-processor 2211a.

The sub-processor 2212a may receive image data from the second camera module 2100b. In addition, each of the sub-processors 2211a and 2212a may output image signals generated by performing a scaling operation to an image generator 2214a. In an example, when the target zoom ratio is less than 1.0× or 5.0× or more, the sub-processor 2211a may scale an image area corresponding to the ROI in image data received from a multiplexer 2213a. When the target zoom ratio is 1.0× or more and less than 5.0×, the sub-processor 2212a may scale an image area corresponding to the ROI in the image data received from the second camera module 2100b.

Each of the sub-processors 2211a and 2212a may output image signals generated by performing a scaling operation to the image generator 2214. When the target zoom ratio is less than 1.0× or 5.0× or more, the image generator 2214 may generate converted image data based on the image signals received from the sub-processor 2211a. In addition, when the target zoom ratio is 1.0× or more and less than 5.0×, the image generator 2214 may generate converted image data based on the image signals received from the sub-processor 2212a.

According to another example embodiment, the application processor 2200b of FIG. 15C may include sub-processors 2211b, 2212b, and 2213b corresponding to the number of the plurality of camera modules 2100a, 2100b, and 2100c, and/or a multiplexer 2215b. The sub-processors 2211b, 2212b, and 2213b of FIG. 15C may operate in the same manner as the sub-processors 2211, 2212, and 2213 of FIG. 15A.

The multiplexer 2215b may receive image signals from each of the sub-processors 2211b and 2213b, and may output one of the received image signals to an image generator 2214b. In an example, the multiplexer 2215b may receive a target zoom ratio and output an image signal corresponding to the target zoom ratio to the image generator 2214b.

When the target zoom ratio is less than 1.0× or 5.0× or more, the image generator 2214b may generate converted image data based on the image signal received from the multiplexer 2215b. In addition, when the target zoom ratio is 1.0× or more and less than 5.0×, the image generator 2214b may generate converted image data based on an image signal received from the sub-processor 2212b.

Figure 16A:
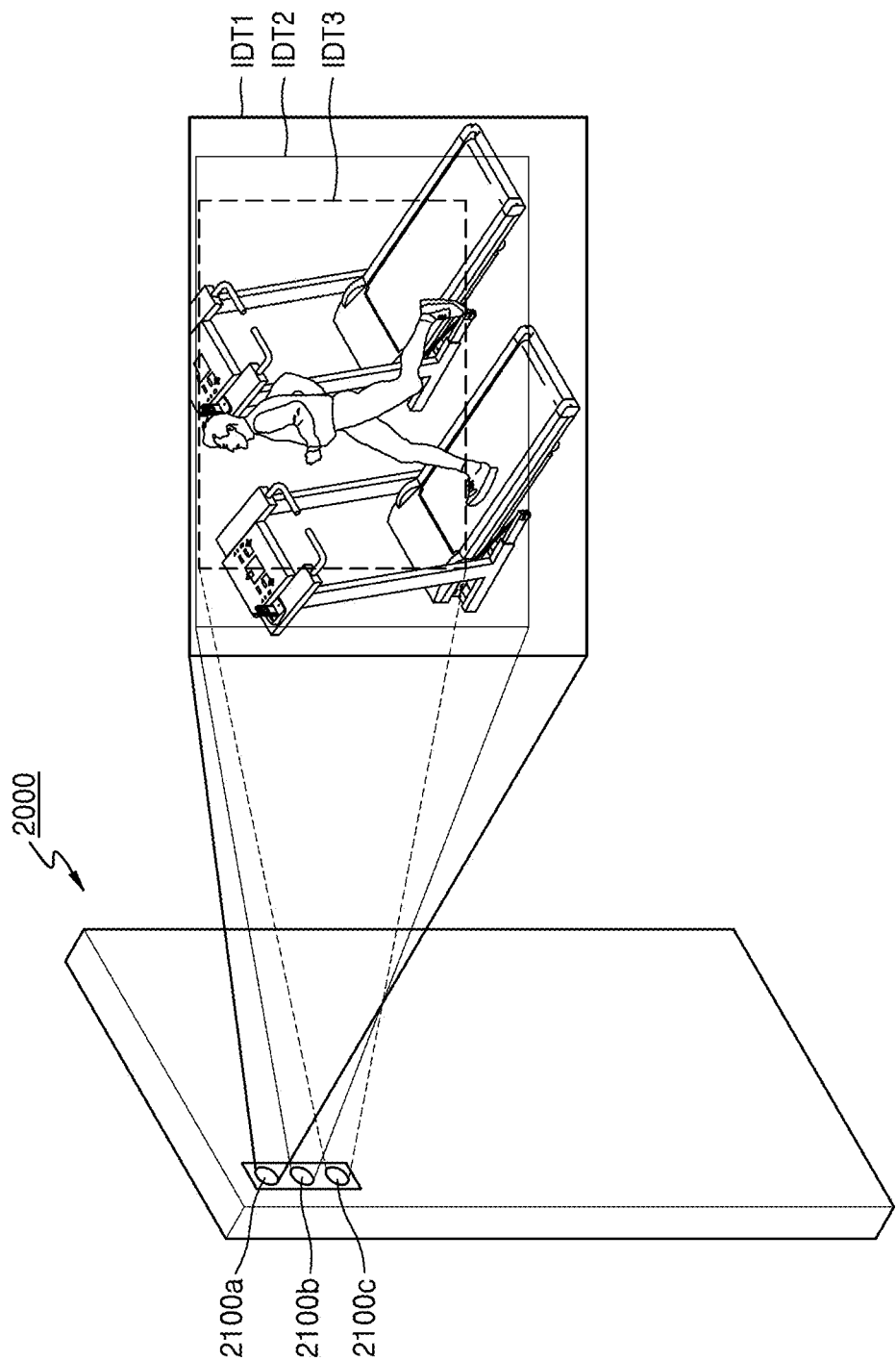
FIGS. 16A to 16C are views illustrating an image capturing operation of an electronic device according to example embodiments.
Figure 16B:
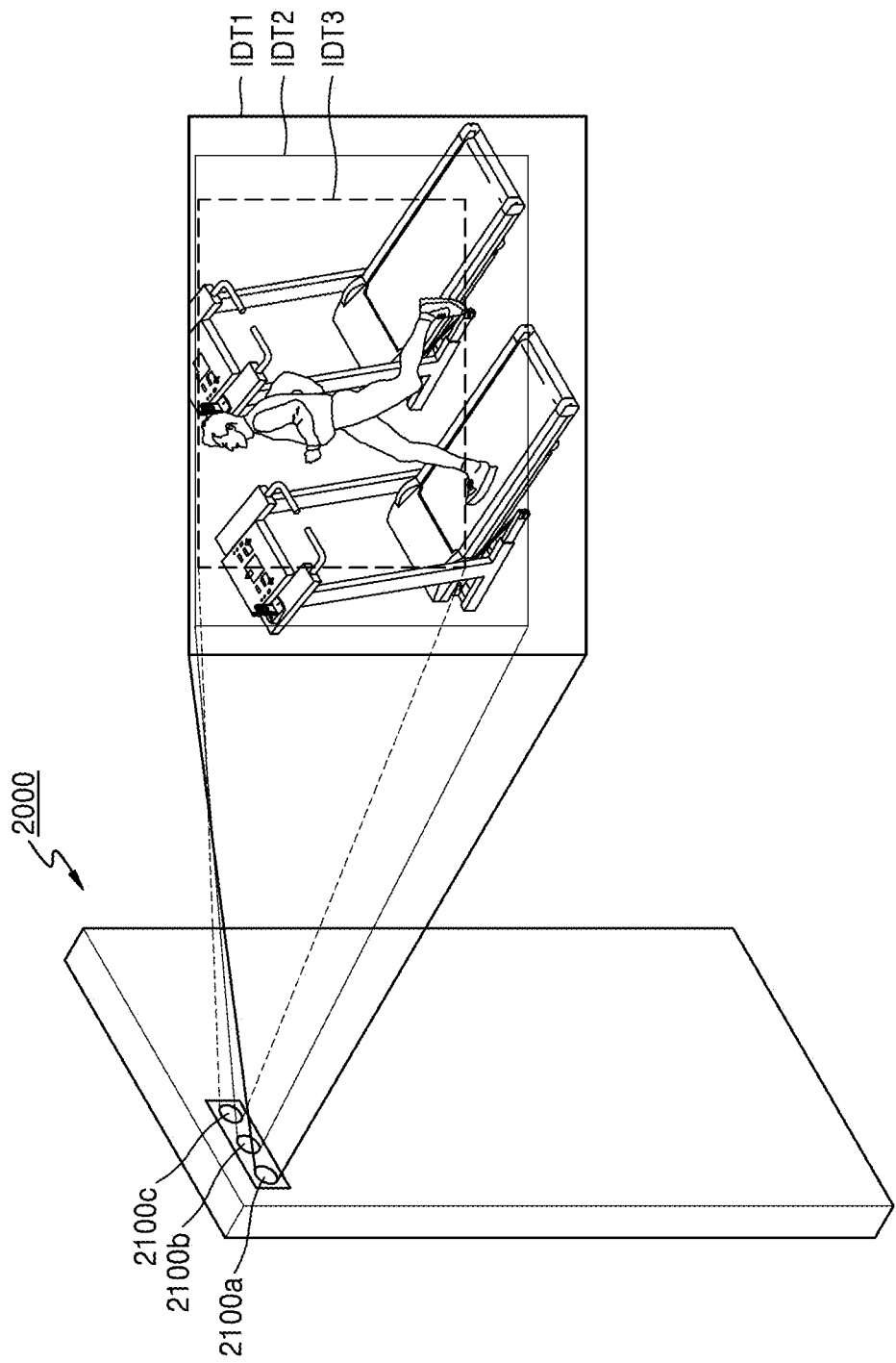
Figure 16C:
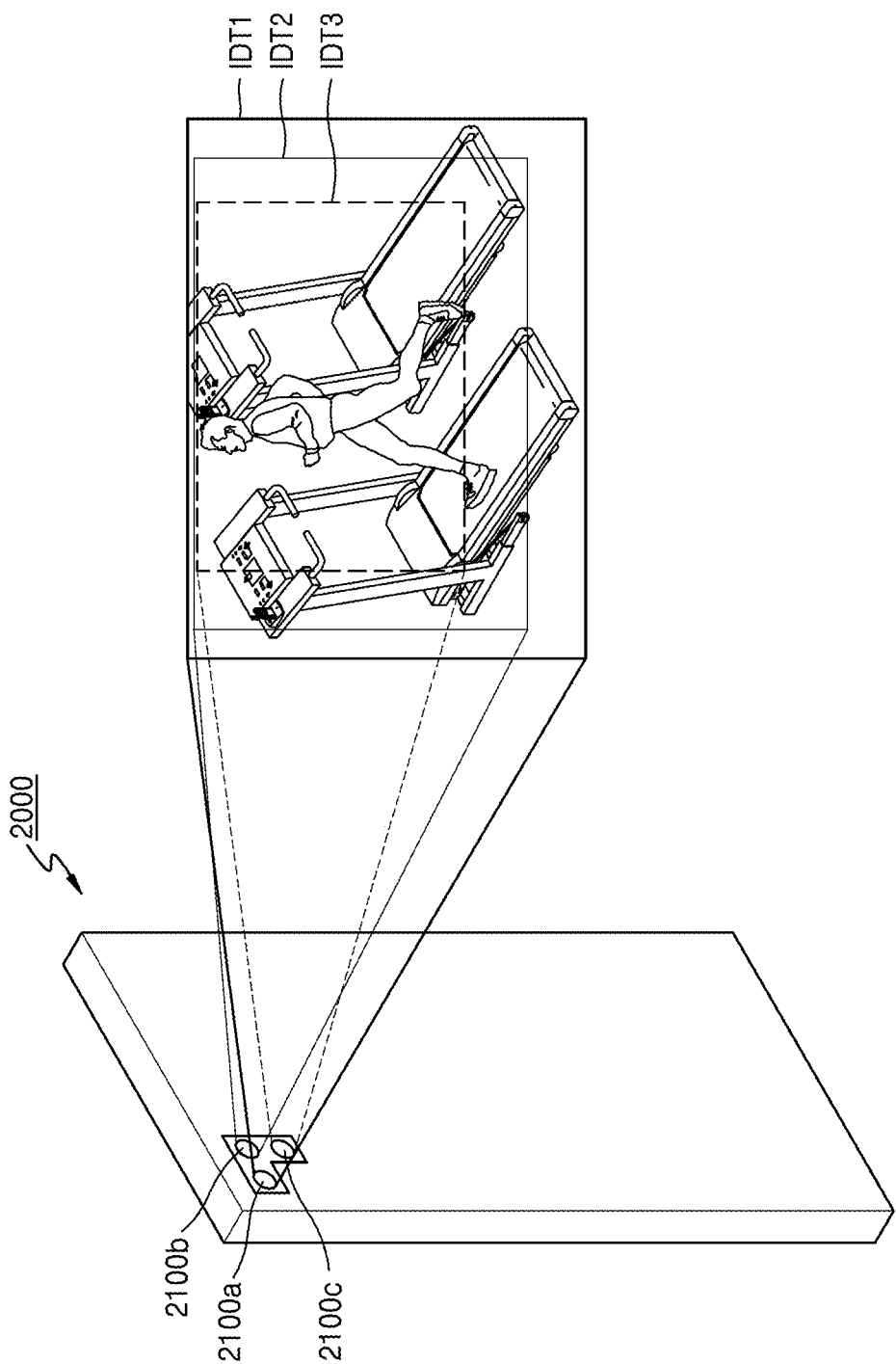

FIGS. 16A to 16C are views illustrating an image capturing operation of the electronic device 2000 according to example embodiments. In some example embodiments, FIGS. 16A to 16C are views illustrating an image capturing operation of the electronic device 2000 of FIG. 15A.

Referring to FIG. 16A, the electronic device 2000 may include the first camera module 2100a, the second camera module 2100b, and the third camera module 2100c arranged side by side in a vertical direction. Alternatively, referring to FIG. 16B, the electronic device 2000 may include the first camera module 2100a, the second camera module 2100b, and the third camera module 2100c arranged side by side in a horizontal direction. Alternatively, referring to FIG. 16C, the electronic device 2000 may include the first camera module 2100a and the second camera module 2100b arranged side by side in a horizontal direction, and may further include the third camera module 2100c under the second camera module 2100b.

The electronic device 2000 may obtain the first image data IDT1, the second image data IDT2, and the third image data IDT3 by capturing an image of a subject based on the first camera module 2100a, the second camera module 2100b, and the third camera module 2100c.

In an example, the electronic device 2000 may obtain the first image data IDT1 of the subject through the first camera module 2100a having the widest field of view, may obtain the second image data IDT2 of the subject through the second camera module 2100b having an intermediate field of view, and may obtain the third image data IDT3 of the subject through the third camera module 2100c having the narrowest field of view.

According to example embodiments, at least one of the first camera module 2100a, the second camera module 2100b, and the third camera module 2100c may change the field of view by adjusting an arrangement of a prism according to a control signal of the camera module controller 2216. In the electronic device 2000, arrangement positions of the first camera module 2100a, the second camera module 2100b, and the third camera module 2100c are not limited to the above-described examples, and may be arranged at various positions.

Figure 17:
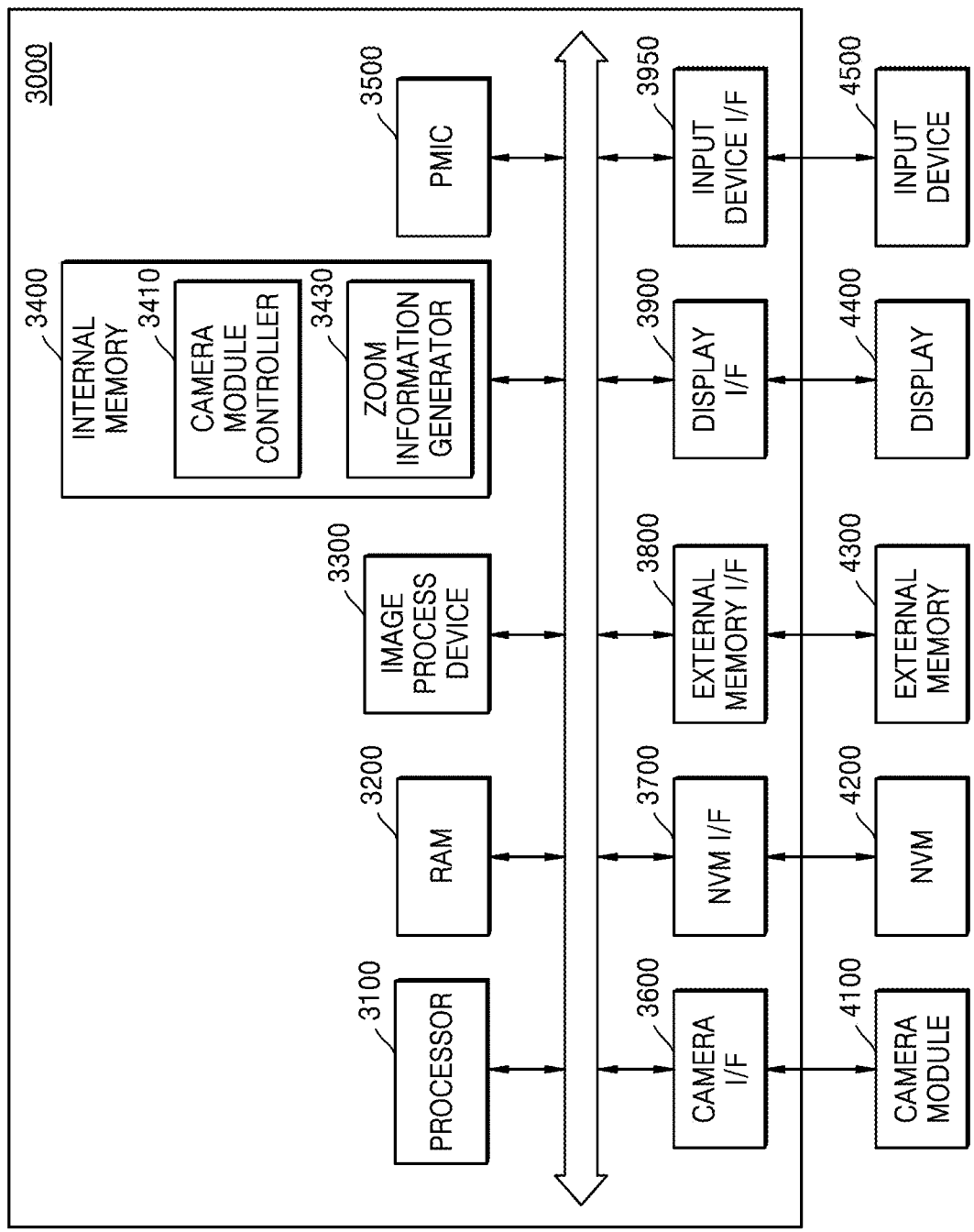
FIG. 17 is a block diagram of a detailed configuration of an application processor according to example embodiments.

FIG. 17 is a block diagram of a detailed configuration of an application processor 3000 according to example embodiments.

Referring to FIG. 17, the application processor 3000 may include a processor 3100, a RAM 3200, an image processing device 3300, an internal memory 3400, a PMIC 3500, a camera interface 3600, a nonvolatile memory interface 3700, an external memory interface 3800, a display interface 3900, and/or an input/output interface 3950.

The processor 3100 may control all operations of the application processor 3000. The processor 3100 may be implemented as, for example, a CPU, a microprocessor, or the like. According to example embodiments, the processor 3100 may be implemented as one computing component having two or more independent processors (or cores), that is, a multi-core processor. The processor 3100 may process or execute programs and/or data stored in the RAM 3200 (or ROM).

The RAM 3200 may temporarily store programs, data, and/or instructions. According to example embodiments, the RAM 3200 may be implemented as dynamic RAM (DRAM) or static RAM (SRAM). The RAM 3200 may be input/output through the interfaces 3600, 3700, 3800, 3900, and 3950 or may temporarily store an image generated by the image processing device 3300.

In an example, the application processor 3000 may further include ROM. The ROM may store programs and/or data that are used continuously. The ROM may be implemented as an erasable programmable ROM (EPROM) or an electrically erasable programmable ROM (EEPROM).

The image processing device 3300 may correspond to the image processing device 1200 of FIG. 1 or the image processing devices 2214, 2214a, and 2214b of FIGS. 15A to 15C. A camera module controller 3410 and a zoom information generator 3430 may be implemented with hardware and loaded into the internal memory 3400. When the image processing device 3300 executes software, functions of the camera module controller 3410 and the zoom information generator 3430 may be implemented. However, the disclosure is not limited thereto, and the camera module controller 3410 and the zoom information generator 3430 may be implemented with hardware or a combination of software and hardware.

The camera interface 3600 may interface image data input from a camera module 4100 located outside the application processor 3000. The camera module 4100 may include two or more camera modules 4100. Image data received through the camera interface 3600 is provided to the image processing device 3300, or may be stored in a nonvolatile memory 4200 or an external memory 4300 through the nonvolatile memory interface 3700 or the external memory interface 3800.

The nonvolatile memory interface 3700 may interface with data input or output from or to the nonvolatile memory 4200. The nonvolatile memory 4200 may be implemented as, for example, a memory card (MMC, eMMC, SD, or micro SD).

The display interface 3900 may interface converted image data output to a display 4400. The display 4400 may output data about an image or a video through a display such as a liquid-crystal display (LCD) or active matrix organic light emitting diodes (AMOLED). The input/output interface 3950 may interface with a user input output from an input device 4500. The input/output interface 3950 may be implemented as a touch panel.

One or more of the elements disclosed above may include or be implemented in one or more processing circuitries such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An electronic device, comprising:
   a display;
   a first camera module having a first field of view (FoV) and configured to generate first image data;
   a second camera module having a second FoV that is less than the first FoV and configured to generate second image data; and
   an application processor configured to
   obtain zoom information including a zoom ratio and a region of interest (ROI) determined based on a user's input,
   generate converted image data by scaling an area corresponding to the ROI of the first image data in response to the zoom ration being included in a first zoom ratio,
   generate the converted image data by scaling an area corresponding to the ROI of the second image data in response to the zoom ratio being included in a second zoom ratio range including zoom ratios greater than those of the first zoom ratio range, and control the display to display the converted image data.

2. The electronic device of claim 1, wherein the application processor is configured to generate a control signal changing the second FoV based on the ROI, and
the second camera module is configured to change the second FoV to an FoV corresponding to the ROI according to the control signal.

3. The electronic device of claim 2, wherein the second camera module is a folded camera module including a prism, and is configured to change the second FoV by adjusting an arrangement of the prism according to the control signal.

4. The electronic device of claim 1, wherein, when the zoom ratio is a first zoom ratio that is a value between the first zoom ratio range and the second zoom ratio range, the application processor is configured to scale an area corresponding to the ROI of the first image data and scales an area corresponding to the ROI of the second image data, and is configured to generate the converted image data by merging the scaled first image data with the scaled second image data.

5. The electronic device of claim 1, wherein the application processor is configured to downscale the first image data when the zoom ratio is included in the second zoom ratio range, and is configured to generate the converted image data by merging the downscaled first image data with the scaled second image data.

6. The electronic device of claim 5, wherein the application processor is configured to generate the converted image data by replacing a partial area of the scaled second image data with the downscaled first image data.

7. The electronic device of claim 1, wherein the application processor is configured to generate a control signal for turning off the second camera module when the zoom ratio is equal to or less than a second zoom ratio that is equal to or less than the first zoom ratio, and is configured to generate a control signal for turning on the second camera module when the zoom ratio exceeds the second zoom ratio.

8. The electronic device of claim 1, wherein the display includes a touch panel configured to generate a touch input signal for a touch gesture of the user, and
the application processor is configured to receive coordinate information about the touch gesture from the display, and is configured to calculate the zoom ratio and the ROI based on the coordinate information about the touch gesture.

9. The electronic device of claim 8, wherein the application processor,
when determining that the touch gesture is a touch gesture for changing a zoom ratio based on the coordinate information about the touch gesture, is configured to calculate the zoom ratio, and,
when determining that the touch gesture is a touch gesture for selecting an ROI based on the coordinate information about the touch gesture, the application processor is configured to calculate the ROI.

10. An application processor comprising:
a first image signal processor configured to receive first image data capturing a first field of view (FoV) from a first camera module, and to generate a first image signal by performing image processing based on the first image data;
a second image signal processor configured to receive second image data capturing a second FoV that is less than the first FoV from a second camera module, and to generate a second image signal by performing image processing based on the second image data; and
a third image signal processor configured to generate converted image data based on at least one of the first image signal and the second image signal,
wherein the first image signal processor, the second image signal processor, and the third image signal processor are configured to obtain zoom information including a zoom ratio and a region of interest (ROI) determined based on a user's input,
wherein the first image signal processor is configured to generate the first image signal by scaling an image area corresponding to the ROI with respect to the first image data when the zoom ratio is included in a first zoom ratio range,
the second image signal processor is configured to generate the second image signal by scaling an image area corresponding to an ROI with respect to the second image data when the zoom ratio is included in a second zoom ratio range, and
the third image signal processor is configured to
generate converted image data based on the first image signal in response to the zoom ratio being included in the first zoom ratio range, and
generate the converted images data based on the second image signal in response to the zoom ratio being included in the second zoom ration range.

11. The application processor of claim 10, wherein the first image signal processor is configured to generate the first image signal by downscaling the first image data when the zoom ratio is included in the second zoom ratio range, and
the third image signal processor is configured to generate the converted image data by merging the first image signal with the second image signal.

12. The application processor of claim 10, further comprising a camera module controller configured to generate a control signal controlling operations of the first camera module and the second camera module,
wherein the camera module controller is configured to generate a control signal controlling the second camera module to have the second FoV corresponding to the ROI.

13. An operation method of an electronic device, the operation method comprising:
receiving first image data capturing a first field of view (FoV) from a first camera module;
receiving second image data capturing a second FoV from a second camera module;
calculating a zoom ratio and a region of interest (ROI) based on a touch gesture of a user;
scaling an area corresponding to the ROI with respect to the first image data in response to the zoom ratio being included in a first zoom ratio range;
scaling an area corresponding to the ROI with respect to the second image data in response to the zoom ratio being included in a second zoom ratio range;
downscaling the first image data in response to the zoom ration being included in the second ratio range;
generating converted image data based on at least one of the scaled first image data and the scaled second image data; and
generating the converted image data by merging the downscaled first image data with the scaled second image data in response to the zoom ratio being included in the second ratio range.

14. The operation method of claim 13, further comprising generating a control signal changing the second FoV of the second camera module based on the ROI.

15. The operation method of claim 13, wherein the generating of the converted image data by merging the downscaled first image data with the scaled second image data comprises generating the converted image data by replacing a partial area of the scaled second image data with the downscaled first image data.

16. The operation method of claim 13, wherein the generating of the converted image data comprises generating the converted image data by overlapping the scaled first image data with the scaled second image data when the zoom ratio is included in the first zoom ratio range and the second zoom ratio range.

17. The operation method of claim 13, wherein the calculating of the zoom ratio and the ROI comprises:
- when determining that the touch gesture is a touch gesture for changing a zoom ratio based on coordinate information about the touch gesture, calculating the zoom ratio; and,
- when determining that the touch gesture is a touch gesture for selecting an ROI based on coordinate information about the touch gesture, calculating the ROI.

* * * * *